(12) United States Patent
Fujiwara et al.

(10) Patent No.: US 6,905,251 B2
(45) Date of Patent: Jun. 14, 2005

(54) OPTICAL CONNECTOR CLEANING TOOL

(75) Inventors: Kunihiko Fujiwara, Sakura (JP); Takaaki Ishikawa, Sakura (JP); Yuwa Tanaka, Sakura (JP)

(73) Assignee: Fujikura Ltd., Tokyo (JP)

( * ) Notice: Subject to any disclaimer, the term of this patent is extended or adjusted under 35 U.S.C. 154(b) by 154 days.

(21) Appl. No.: 10/286,432

(22) Filed: Nov. 1, 2002

(65) Prior Publication Data

US 2004/0086232 A1 May 6, 2004

(30) Foreign Application Priority Data

| Oct. 30, 2002 | (JP) | .................................... P 2002-316881 |
| Oct. 30, 2002 | (JP) | .................................... P 2002-316882 |
| Oct. 30, 2002 | (JP) | .................................... P 2002-316883 |

(51) Int. Cl.[7] .............................................. G02B 6/36
(52) U.S. Cl. ............................ 385/53; 15/97.1; 385/147
(58) Field of Search ........................ 385/50–55, 88–90, 385/147; 15/97.1, 104.002, 220.4, 101, 102

(56) References Cited

U.S. PATENT DOCUMENTS 5,836,031 A * 11/1998 Cox ....................... 15/104.002
5,956,793 A * 9/1999 Cox ....................... 15/104.002
6,209,163 B1 4/2001 Clairadin et al.

* cited by examiner

*Primary Examiner*—Akm Enayet Ullah
(74) *Attorney, Agent, or Firm*—Hoffmann & Baron, LLP

(57) ABSTRACT

An optical connector cleaning tool, which can easily and reliably clean a connecting end face of an optical connector while the optical connector is disposed in a connector housing, is disclosed. The optical connector cleaning tool comprises a tool body, and an insertion portion which is provided so as to project from the tool body, and which is adapted to be inserted into the connector housing, and the optical connector cleaning tool is adapted such that the cleaning element disposed at an end of the insertion portion projecting from the tool body is positioned and abutted against the connecting end face when the insertion portion is inserted into the connector housing. It is easy to insert the cleaning element into the connector housing and to abut the cleaning element against the connecting end face. Furthermore, it is easy to maintain the cleaning element in position abutting against the connecting end face when the cleaning element is moved for wiping the connecting end face.

9 Claims, 24 Drawing Sheets

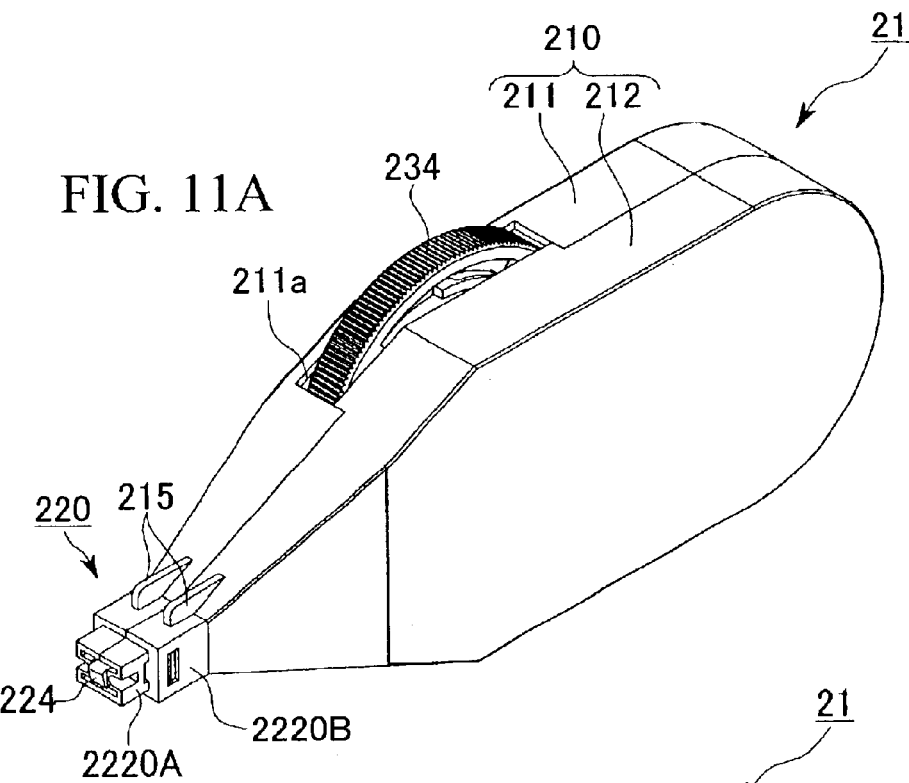
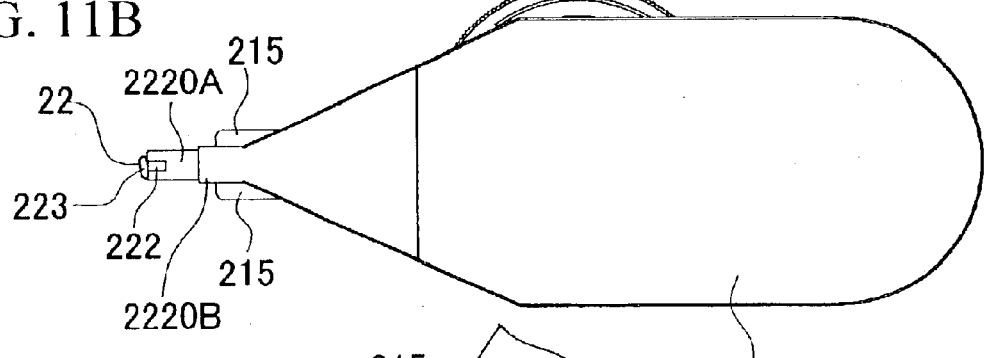
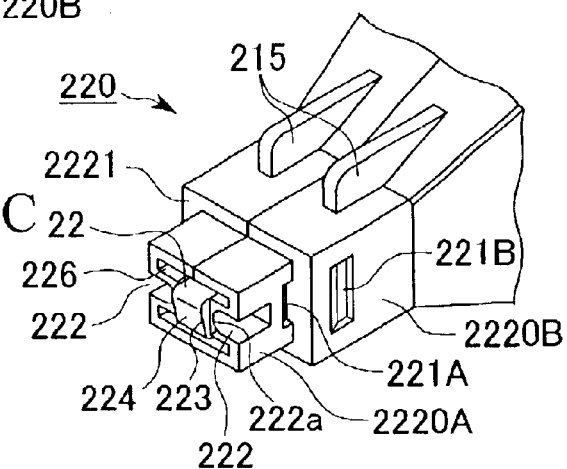

OPTICAL CONNECTOR CLEANING TOOL

BACKGROUND OF THE INVENTION

1. Field of the Invention

This invention relates to an optical connector cleaning tool for cleaning a connecting end face of an optical connector disposed inside a connector housing.

2. Background Art

As is well known in the art, an optical connector, referred to as a "plug-adapter-plug connecting type optical connector", is an optical connector in which optical connectors (plugs) are inserted into a connector housing as an adapter from both ends thereof so that the optical connectors are connected to each other inside the adapter.

On the other hand, an optical connector, referred to as a "plug-receptacle connecting type optical connector", is an optical connector in which one optical connector to be connected (such as a ferrule) is held inside a connector housing as a receptacle, and the other optical connector (a plug) is inserted into the receptacle so as to face the one optical connector and so as to be connected thereto.

The connection between optical connectors in a connector housing using an adapter or a receptacle is practically performed by disposing end faces of optical fibers, each of which is exposed at a connecting end face of the optical connector, so as to abut against each other.

When an optical connector is inserted into a connector housing for abutted connection, the connecting end face of the optical connector must be cleaned prior to abutted connection because the connecting end face of the optical connector may become contaminated with dirt, dust, or oil, which may lead to damage occurring during attaching or detaching, or to an increase in transmission loss. Conventionally, the connecting end face is cleaned, in general, using a swab impregnated with alcohol or using a cleaning tool having a cleaning tape in such a manner that the swab or cleaning tool is held by hand and is abutted against the connecting end face of the optical connector to wipe the end face.

In general, in the case of a plug-adapter-plug connecting type optical connector in which optical connectors (plugs) are inserted into a connector housing as an optical connector adapter from both ends thereof so as to be connected to each other inside the adapter, each of the optical connectors (plugs) to be connected is cleaned while being separated from the connector housing. Moreover, for a plug-adapter-plug connecting type optical connector, or for a plug-receptacle connecting type optical connector in which an optical connector (a plug) inserted into a connector housing as an optical connector receptacle is connected to another optical connector (such as a ferrule) held inside the optical connector receptacle, some special cleaning tools have been proposed (see, for, example, Japanese Unexamined Patent Application, First Publication No. 2000-284147) which are inserted into the connector housing through an aperture thereof so as to clean the connecting end face of the optical connector that is disposed at the back as viewed from the aperture. By using such cleaning tools, the connecting end face can be cleaned without removing the optical connector (plug) from the optical connector adapter.

SUMMARY OF THE INVENTION

When one of the above-mentioned tools is used to clean the connecting end face of the optical connector disposed inside the connector housing, the tool must be inserted into a space (a connector insertion hole) in the connector housing which is provided for inserting the other optical connector for cleaning operation for the connecting end face. Because the connecting end face to be cleaned is disposed at the back of the connector insertion hole and is very difficult to see, it is difficult to check whether the cleaning tool is sufficiently abutted against the connecting end face, or how much of the cleaning operation has been performed; therefore, the cleaning operation may not be sufficiently performed.

Moreover, if the cleaning tool contacts the inner wall of the connector housing, the cleaning tool may become contaminated, and if the contaminated tool is abutted against the connecting end face, the connecting end face may become contaminated or may be damaged during cleaning. Therefore, the cleaning tool must be carefully inserted, which forces an operator to perform a difficult cleaning operation.

On the other hand, if the optical connector to be cleaned is removed from the connector housing, the connecting end face is easy to see, and it is easy to abut the cleaning tool against the connecting end face; however, the optical connector must be carefully inserted into the connector housing after cleaning so as not to become contaminated with dirt or dust again, which, in addition to detaching and attaching operation for the optical connector, leads to a problem due to very complicated operation.

In the case of cleaning a plug-adapter-plug connecting type optical connector, complicated and low efficiency operation is required if cleaning must be performed after the optical connectors (plugs) respectively inserted into the optical connector adapter from either side thereof are removed from the optical connector adapter. If a special cleaning tool is used, it is possible to insert the special tool through the aperture of the connector housing so as to reach and clean the connecting end face of the optical connector which is disposed at the back as viewed from the aperture; therefore, in the case of, for example, an adapter type optical connector, it is advantageous that one optical connector (plug) to be connected can be cleaned while being inserted in the optical connector adapter by inserting the cleaning tool into the optical connector adapter from the other end thereof. However, in general, conventional tools are specialized for specific types of connector housings such as an optical connector adapter, several kinds of cleaning tools must be prepared in the workshop so as to be able to deal with several types of connector housings such as an optical connector adapter, which is disadvantageous in terms of workability and cost. Furthermore, even in the case of using a cleaning tool whose tip portion to be inserted into the connector housing is replaceable, the replacement operation is generally very time consuming, and an enormous effort is required to frequently replace the tip portion of the cleaning tool to be inserted into the connector housing in the workshop, depending on the types of connector housings, which is not practical.

Accordingly, an object of the present invention is to provide an optical connector cleaning tool which enables an easy and reliable cleaning operation for a connecting end face of an optical connector while the optical connector is inserted in a connector housing.

Another object of the present invention is to provide an optical connector cleaning tool which enables cleaning operation for several connecting end faces of optical connectors inserted in a connector housing depending on the types and sizes of the connector housings because the insertion portion of the cleaning tool to be inserted into the connector housing is replaceable with only one body.

In order to achieve the above objects, the present invention provides an optical connector cleaning tool for cleaning a connecting end face of an optical connector disposed inside a connector housing by movement of a cleaning element to wipe the connecting end face, comprising: a tool body; and an insertion portion which is provided so as to project from the tool body, and which is adapted to be inserted into the connector housing, wherein the cleaning element disposed at an end of the insertion portion projecting from the tool body is positioned against the connecting end face when the insertion portion is inserted into the connector housing.

According to the above optical connector cleaning tool, because contact of the cleaning element with the inner wall of the connector housing is prevented by the insertion portion, contamination of the cleaning element can be avoided. Moreover, because the cleaning element can be appropriately abutted against the connecting end face of the optical connector disposed inside the connector housing only by inserting the insertion portion into the connector housing, workability is superior, and a sufficient cleaned state of the connecting end face of the optical connector can be easily and reliably obtained.

In the above optical connector cleaning tool of the present invention, the cleaning element may be a tape, the tool body may be provided with a supply reel which holds the tape in a wound manner and a winding reel which retrieves the tape after cleaning by winding the same, and a head element may be provided at the insertion portion, which has an abutting surface at a tip thereof for ensuring abutting area against the connecting end face, and which is adapted so that the tape supplied from the supply reel runs along the abutting surface.

According to the above optical connector cleaning tool, because the unused portion of the tape is sequentially supplied to the head element from the supply reel, and the used portion of the tape after abutting against the connecting end face of the optical connector is sequentially retrieved by the winding reel, a portion of the cleaning element abutted against the connecting end face can be constantly maintained in clean condition; therefore, an efficient cleaning operation can be achieved.

In the above optical connector cleaning tool, if the head element is adapted so that the direction of the abutting surface with respect to the direction of insertion of the insertion portion is adjustable, the direction of the abutting surface of the head element can be aligned with the direction of the connecting end face of the optical connector even though the direction of the connecting end face of the optical connector is not aligned with the direction of insertion of the insertion portion; therefore, efficiency of cleaning may be improved.

In the above optical connector cleaning tool, the insertion portion may preferably comprise a recess for preventing interference with a projecting element (e.g., a guide pin in an MPO type optical connector, which will be explained below) projecting from the connecting end face. Accordingly, cleaning can be sufficiently performed by abutting the cleaning element against the connecting end face even though there is a projecting element on the connecting end face.

In order to achieve the aforementioned objects, the present invention further provides an optical connector cleaning tool for cleaning a connecting end face of an optical connector disposed inside a connector housing by movement of a cleaning element to wipe the connecting end face, comprising: a tool body; an insertion portion which is provided so as to project from the tool body, and which is adapted to be inserted into the connector housing; a cleaning element disposed at an end of the insertion portion; and a driving section for moving the cleaning element, wherein the insertion portion is provided with insertion units at a plurality of positions in the projecting direction thereof, each of which is positioned in the connector housing when being inserted into one of connector housings which differ from each other, and wherein any one of the insertion units provided on the insertion portion is formed so as to be insertable into any connector housing which can house another insertion unit located behind the one insertion unit as viewed in the projecting direction.

According to the above optical connector cleaning tool, because the insertion portion can be inserted into various connector housings in an appropriately positioned manner by using the insertion units, various optical connectors can be cleaned just by one cleaning tool.

Moreover, because contact of the cleaning tool with the inner wall of the connector housing is prevented by the insertion portion, contamination of the cleaning element can be avoided. In addition, because the cleaning tool can be appropriately abutted against the connecting end face of the optical connector disposed inside the connector housing only by inserting the insertion portion into the connector housing, workability is superior, and a sufficiently cleaned state of the connecting end face of the optical connector can be easily and reliably obtained.

In the above optical connector cleaning tool of the present invention, the cleaning element may be a tape which runs around a head element provided at a projecting tip of the insertion portion projecting from the tool body, and which is adapted to be abutted against the connecting end face of the optical connector disposed in the connector housing by an abutting surface of the head element, and the driving section may be a tape feeding section which feeds and moves the tape.

According to the above optical connector cleaning tool, because the unused portion of the tape is sequentially supplied to the head element by the tape feeding section, and the used portion of the tape after abutting against the connecting end face of the optical connector is sequentially retrieved by the tape feeding section, a portion of the cleaning element abutted against the connecting end face can be constantly maintained in clean condition; therefore, an efficient cleaning operation can be achieved.

In order to achieve the aforementioned objects, the present invention further provides an optical connector cleaning tool for cleaning a connecting end face of an optical connector disposed inside a connector housing by movement of a cleaning element to wipe the connecting end face, comprising: a tool body; an insertion portion which is provided so as to project from the tool body, which is positioned by an inner wall of the connector housing when being inserted into the connector housing, and which is engaged and held in the connector housing in a detachable manner; a cleaning element which is provided at an end of the insertion portion, and which is positioned and abutted against the connecting end face of the optical connector disposed inside the connector housing; and a driving section for moving the cleaning element, wherein the insertion portion is adapted to be replaceable with other insertion portions with respect to the tool body.

In the above optical connector cleaning tool of the present invention, the insertion portion may be a sleeve-shaped housing which houses the cleaning element and which is attached to a fitting portion of the tool body in a detachable manner.

In the above optical connector cleaning tool of the present invention, the cleaning element may be a tape which runs around a head element provided at a projecting tip of the insertion portion projecting from the tool body, and which is adapted to be abutted against the connecting end face of the optical connector disposed in the connector housing by an abutting surface of the head element, and the driving section may be a tape feeding section which feeds and moves the tape.

According to the above optical connector cleaning tool, the connecting end face of the optical connector disposed in various connector housings having various sizes, etc., can be cleaned by merely replacing the insertion portion, without changing the tool body, in such a manner that one of the insertion portions is selected depending on type, size, etc., of the connector housings, and the selected insertion portion is attached to the tool body.

BRIEF DESCRIPTION OF THE DRAWINGS

FIG. 11A is a perspective view showing the entirety of an optical connector cleaning tool according to a second embodiment, FIG. 11B is a side view of the cleaning tool, and FIG. 11C is an enlarged perspective view showing the insertion portion of the cleaning tool.

DETAILED DESCRIPTION OF THE PREFERRED EMBODIMENTS

The present invention will be explained in detail below based on the first embodiment.

Figure 1A:
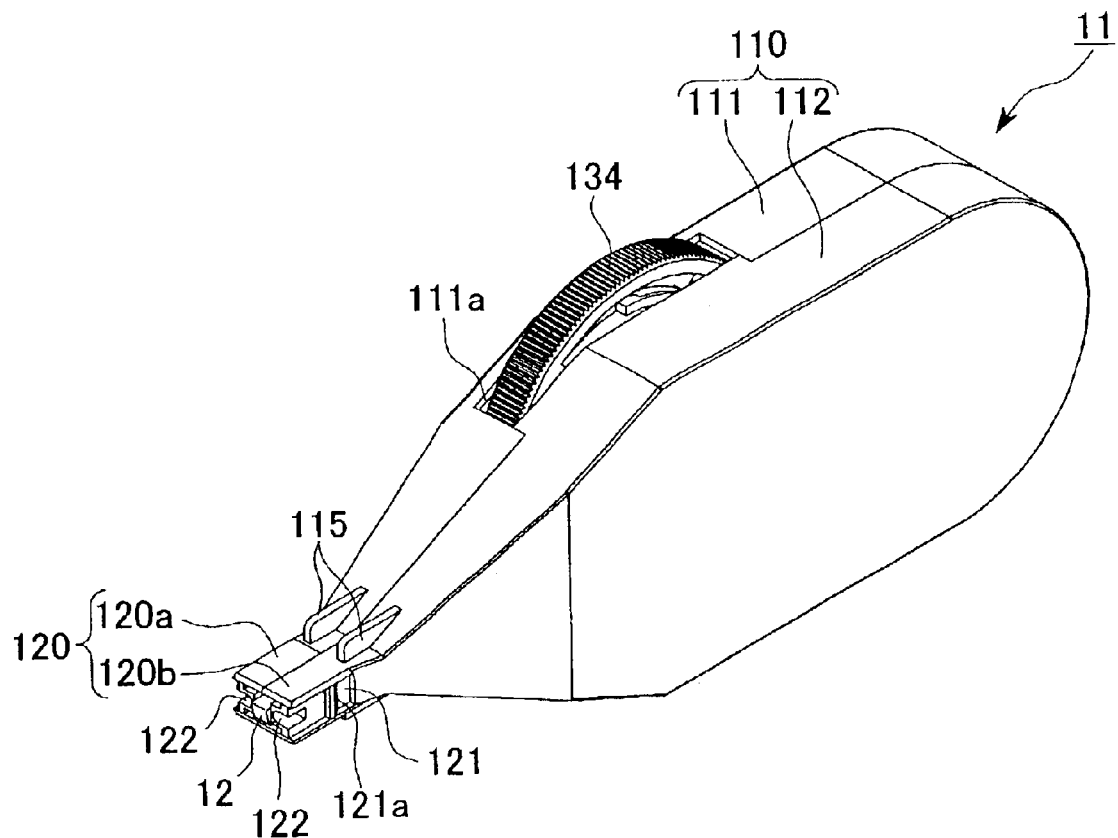
FIG. 1A is a perspective view showing an optical connector cleaning tool (hereinafter referred to as a cleaning tool) according to a first embodiment.
Figure 1B:
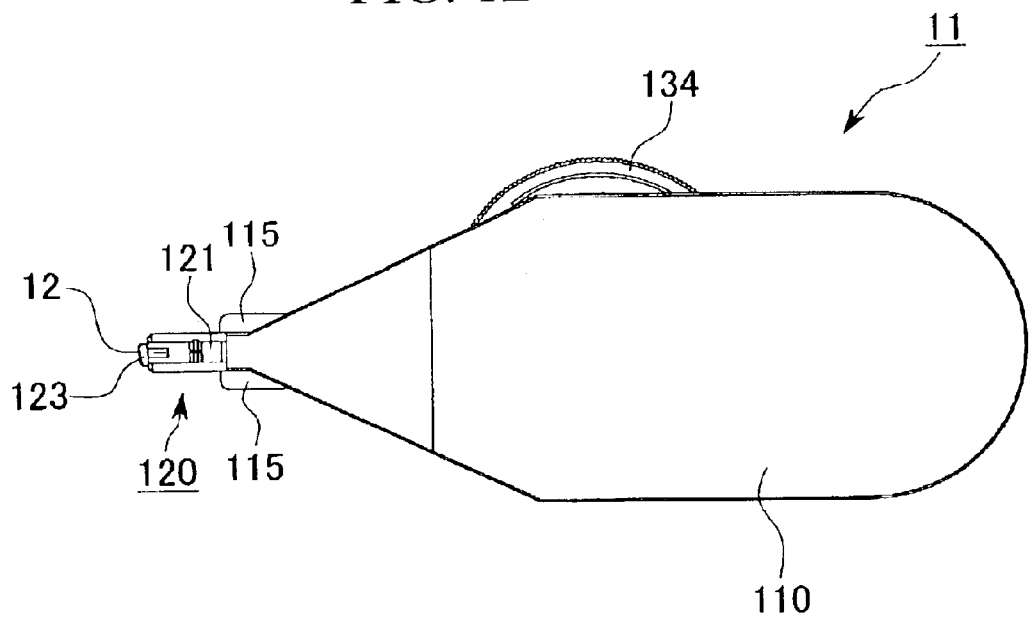
FIG. 1B is a side view of the cleaning tool.
Figure 2:
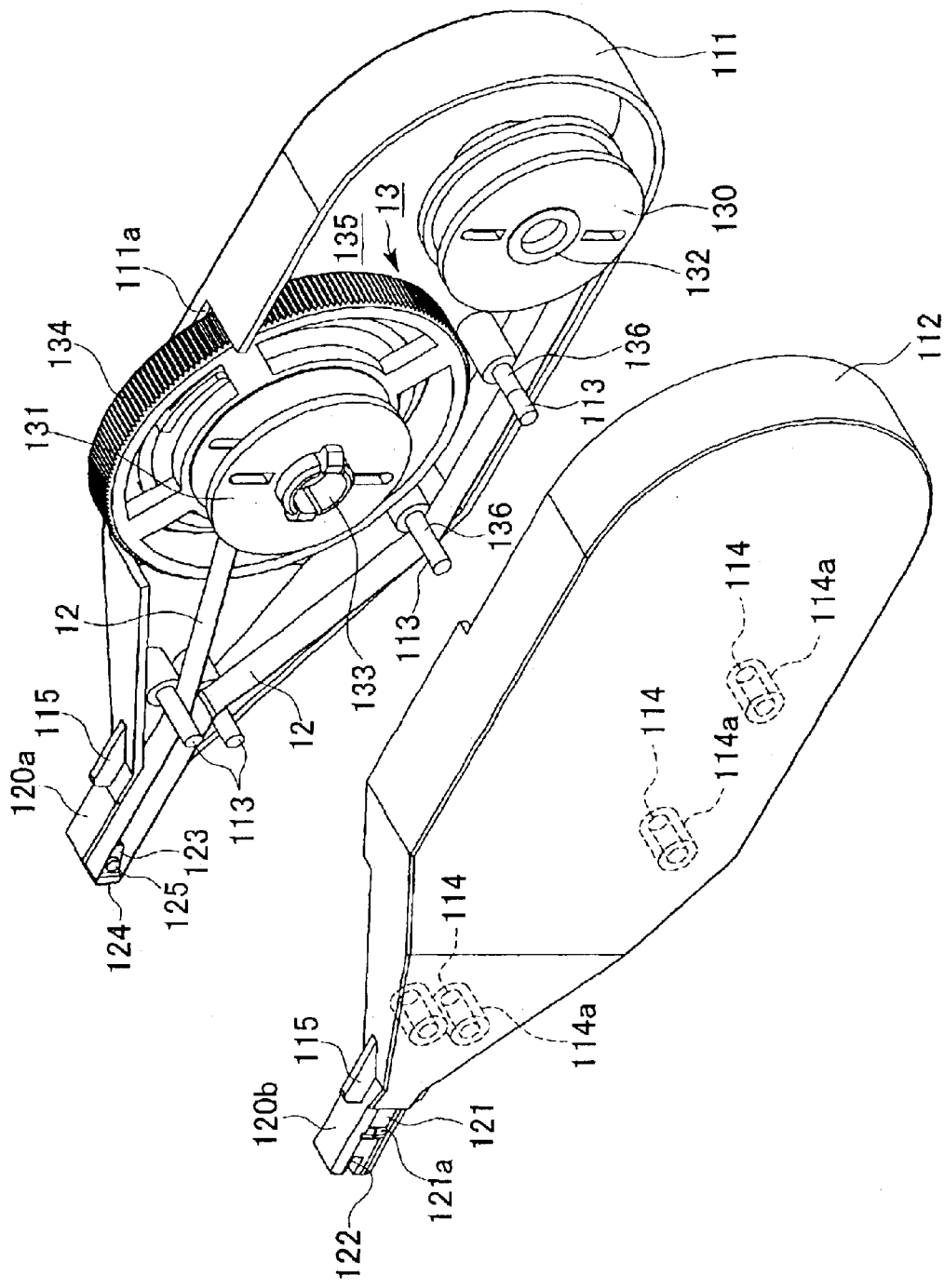
FIG. 2 is a perspective view showing a state in which the tool body of the cleaning tool is split into halves.

FIGS. 1A and 1B are respectively a perspective view and a side view showing an optical connector cleaning tool (hereinafter referred to as a cleaning tool) according to the first embodiment, and FIG. 2 is a perspective view showing a state in which the tool body of the cleaning tool is split into halves.

Figure 3:
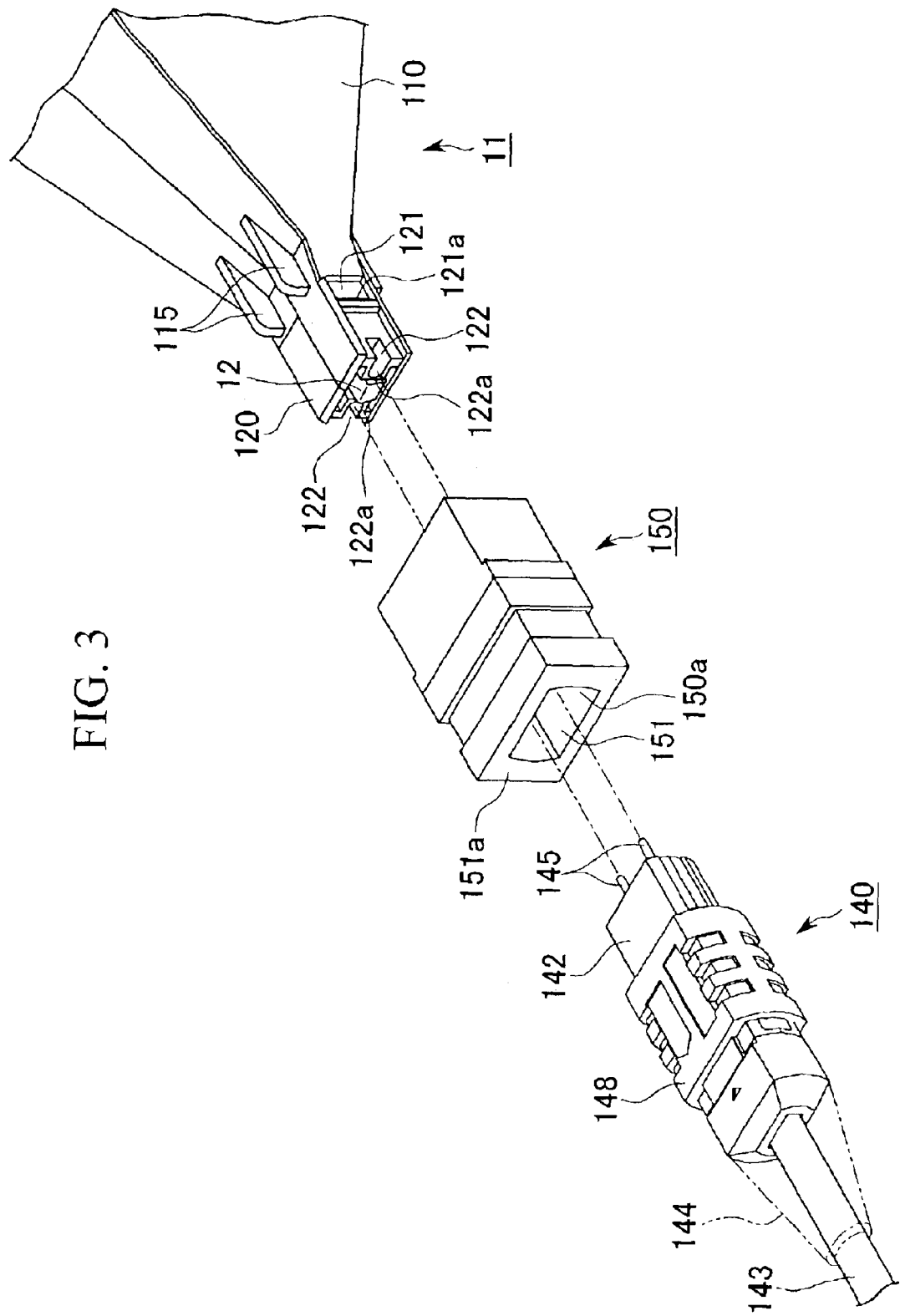
FIG. 3 is an exploded perspective view showing a state in which the tip of the cleaning tool shown in FIGS. 1A and 1B is going to be inserted into a connector insertion hole of a connector housing in which an optical connector is accommodated.
Figure 4:
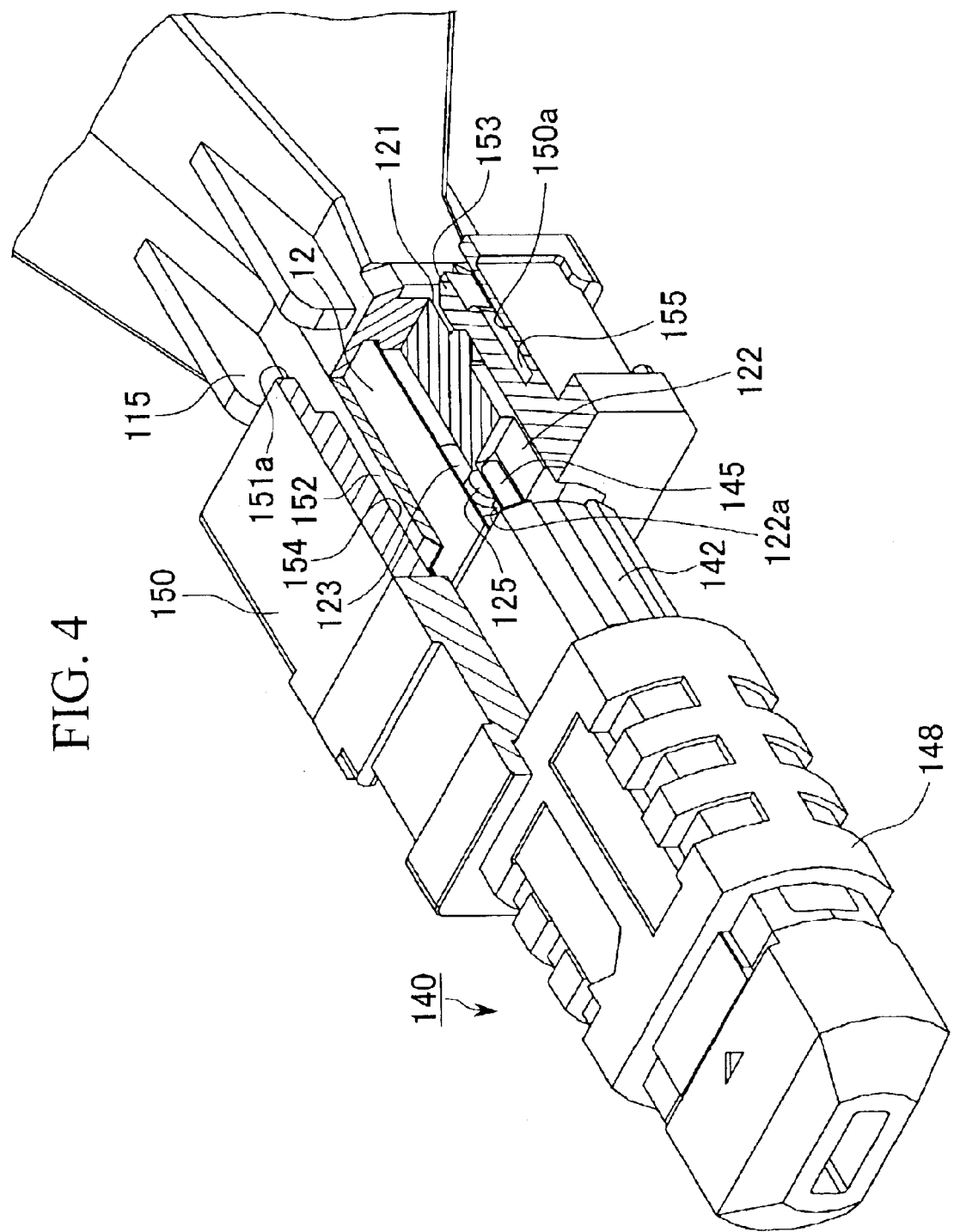
FIG. 4 is a perspective view showing a state in which the tip of the cleaning tool shown in FIGS. 1A and 1B has been inserted into the connector insertion hole of the connector housing in which the optical connector is accommodated.
Figure 5:
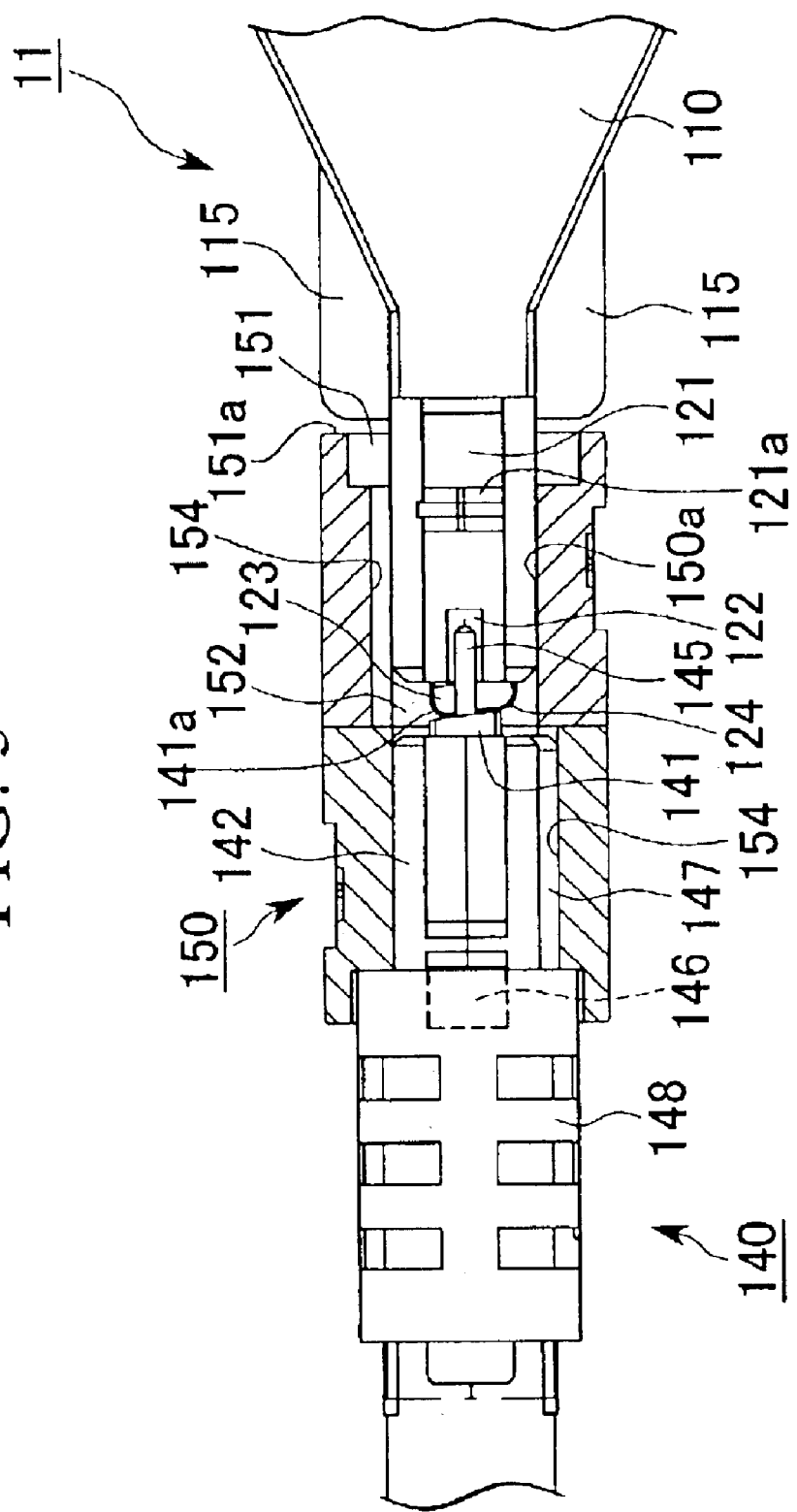
FIG. 5 is a cross-sectional view showing a state in which the tip of the cleaning tool shown in FIGS. 1A and 1B has been inserted into the connector insertion hole of the connector housing in which the optical connector is accommodated.

FIG. 3 is an exploded perspective view showing a state in which an insertion portion of the cleaning tool is going to be inserted into a connector insertion hole of a connector housing in which an optical connector is accommodated, FIG. 4 is a perspective view showing a state in which the insertion portion has been inserted into the connector insertion hole, and FIG. 5 is a cross-sectional view showing a state in which the insertion portion has been inserted into the connector insertion hole.

Figure 6A:
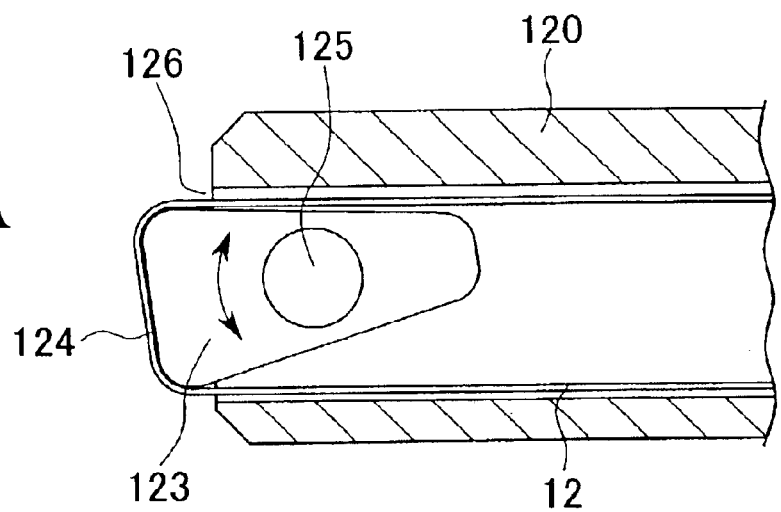
FIG. 6A is a longitudinal cross-sectional view showing the vicinity of the tip of the cleaning tool.
Figure 6B:
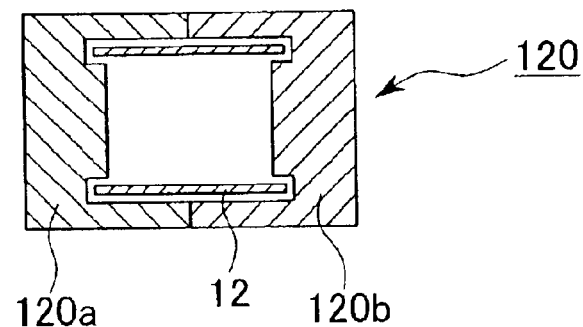
FIG. 6B is a transverse cross-sectional view showing the vicinity of the tip of the cleaning tool.
Figure 7:
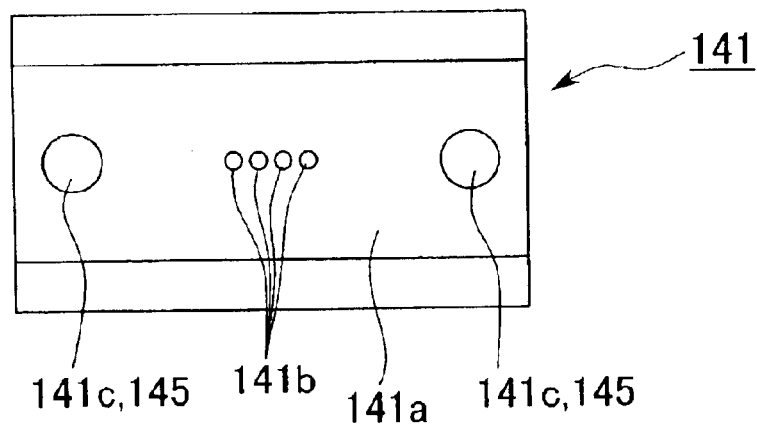
FIG. 7 is a front view showing a connecting end face of the optical connector.

FIGS. 6A and 6B are respectively a longitudinal and transverse cross-sectional views showing the vicinity of the tip of the cleaning tool. FIG. 7 is a front view showing a connecting end face of the optical connector.

As shown in FIGS. 3 to 7, an optical connector 140 (a plug) and a connector housing 150 (an adapter) to which a cleaning tool 11 according to the present embodiment is applied are included in an MPO (Multifiber Push On) type optical connector specified in JIS (Japanese Industrial Standards) C 5982.

The optical connector 140 is an optical connector plug whose cross section is generally formed to be shallow, and in which an MT (Mechanically Transferable) type optical connector ferrule 141 (hereinafter simply referred to as a ferrule) is housed in the end portion of a plastic housing 142 having a sleeve shape.

Note that, in the following description, a direction corresponding to short sides of the shallow cross section of the optical connector 140 (the vertical direction in FIG. 7) may be referred to as the direction of thickness, and a direction corresponding to long sides thereof (the lateral direction in FIG. 7) may be referred to as the direction of width. In addition, corresponding to the directions of thickness and width of the optical connector 140, the terms of the directions of thickness and width may also be used for explaining a connector housing 150 to be connected to the optical connector 140 and for referring to an insertion portion 120 of the cleaning tool 11 which is to be inserted into the connector housing 150.

Predetermined number of optical fiber holes 141b are opened to a connecting end face 141a of the ferrule 141 in an aligned manner. The end of an optical fiber 143 is disposed through one of the optical fiber holes 141b so as to be connectable to another optical fiber in an abutting manner, and the optical fiber 143 runs through the optical connector 140 and extends from the rear end of the optical connector 140.

The optical fiber 143 extending from the rear end of the optical connector 140 is housed in a boot 144 provided on the housing 142 at the rear end thereof as viewed in the direction of connection so as not to be sharply bent at the vicinity of the rear end of the optical connector 140.

The optical fiber 143 is not limited to a specific one, but may be, for example, a single coated optical fiber, a multi-core coated optical fiber, an optical fiber code in which coated optical fibers are surrounded by a tube, or the like. In the case of a coated optical fiber or an optical fiber code, the end thereof is formed by inserting a bare optical fiber, which is exposed by removing coating at the end portion thereof, into one of the optical fiber holes 141b of the ferrule 141 so as to be connectable in an abutting manner.

There are formed guide pin holes 141c in the connecting end face 141a of the ferrule 141 at both sides of the area in which the optical fiber holes 141b are formed. Two ferrules 141 are connected to each other at the respective connecting end faces 141a in an abutting manner using guide pins 145 (projecting elements) which project from the connecting end face 141a in order to be inserted into the guide pin holes 141c so as to be accurately positioned with respect to each other by a well known guide pin mating type positioning mechanism, and as a result, the optical fibers 143, each of which is formed so that the end thereof is exposed at the end of the ferrule 141, are optically connected to each other.

The adapter 150 is generally formed in a sleeve shape, and is adapted so that the optical connectors 140 inserted through the connector insertion apertures 151 disposed at either ends of the adapter 150 are accommodated in a connector accommodating hole 152 formed in the adapter 150.

In either side surfaces, disposed in the direction of width, of the housing 142 of the optical connector 140, there are provided engagement recesses 146 which are adapted to engage elastic engagement fingers 153 that extend from the adapter 150 toward the connector insertion aperture 151 along the inner wall 150a thereof. In addition, on one of the surfaces, disposed in the direction of thickness, of the housing 142 of the optical connector 140, there is provided a key 147 which projects from the surface, and which is adapted to engage a key groove 154 that extends from the connector insertion aperture 151 to an approximate middle point as viewed in the direction of insertion (right-to-left direction in FIG. 6A) along the inner wall 150a of the adapter 150.

Moreover, a coupling 148 is installed on the outer surface of the housing 142 which is inserted into gap 155 formed between the inner wall 150a of the adapter 150 and the engagement fingers 153 after the engagement fingers 153 and the engagement recesses 146 are engaged so as to hold the engagement fingers 153 from outside, and so as to prevent disengagement of the engagement fingers 153 from the engagement recesses 146.

When the optical connector 140 is inserted through the connector insertion aperture 151, the optical connector 140 is accommodated in the connector accommodating hole 152 in such a manner that the movement of the optical connector 140 in a direction other than the direction of insertion is restricted by the engagement of the engagement fingers 153 with the engagement recesses 146, and by the fitting of the key 147 into the key groove 154.

When two optical connectors 140 are inserted into the adapter 150, the respective ferrules 141 are abutted to each other, whereby the optical fibers 143, each end of which is formed as the ferrule 141, are optically connected.

A cleaning tool 11 of the present embodiment, which is applicable to cleaning of the connecting surface 141a of the above connector 140, comprises a tool body 110 which is generally formed like a casing, and which accommodates a cleaning element 12 therein, an insertion portion 120 which projects from the tool body 110, and which is adapted to be insertable into the connector accommodating hole 152 of the adapter 150, and a driving section 13 which moves the cleaning element 12.

The tool body 110 is made of plastic or the like in a half-split structure, in which a first half casing 111 and a second half casing 112 face each other, and the first and second half casings 111 and 112 are integrated by fitting a engagement pins 113 projecting inside the first half casing 111 into engagement holes 114 formed in bosses 114a projecting inside the second half casing 112.

The tool body 110 is formed in a shape converging toward the insertion portion 120, and has stoppers 115 at connecting area to the insertion portion 120. The stoppers 115 are provided to prevent the insertion portion 120 from being too deeply inserted into the connector accommodating hole 152, when the insertion portion 120 is inserted into the connector accommodating hole 152 of the adapter 150, in such a manner that the stoppers 115 abut against the peripheral portion 151a of the connector insertion aperture 151.

In this embodiment, the cleaning element 12 is a tape. The tape 12 is not limited to a specific type, but may be an appropriate and known clean cloth processed into a tape shape, and for example, a tape fabricated by weaving ultrafine fabric made of polyester, nylon, etc., may be used.

The width of the tape 12 is determined so that the all end faces and peripheries thereof of the optical fibers, which are exposed at the connecting end face 141a of the optical connector 140, can be wiped at one time.

As shown in FIG. 6B, the movement of the tape 12 accommodated in the insertion portion 120 in the direction of width is restricted by the inner walls of the insertion portion 120, whereby the lateral shift of the tape 12 is prevented.

In an accommodating space 135 of the half casings 111 and 112, there is provided a tape feeding section as a driving section 13.

The tape feeding section 13 comprises a supply reel 130 on which the tape 12 is wound, a winding reel 131 for retrieving the tape 12 in a wound manner after the tape 12 is used, and a control dial 134 for controlling movement of the tape 12.

On the inside surface (facing the accommodating space 135) of the first half casing 111, there are provided a supply reel support axis 132 on which the supply reel 130 is mounted in a rotatable manner, and a winding reel support axis 133 on which the winding reel 131 is mounted in a rotatable manner.

On the outer periphery of the winding reel support axis 133, the control dial 134 is mounted coaxially with the winding reel 131.

A portion of the control dial 134 is exposed outside of the tool body 110 through a window 111a formed in the side surface of the first half casing 111. When the control dial 134 is rotated by hand or the like in a predetermined direction, the winding reel 131 is rotated so as to take up the tape 12, while on the other hand, the unused portion of the tape 12 is fed from the supply reel 130. Because the window 111a opens in the side surface of the tool body 110, it is easy to operate the control dial 134 by fingers of a hand with which the cleaning tool 11 is held even when the cleaning tool 11 is held by the same hand.

The radius of the control dial 134 is determined to be greater than that of the winding reel 131. As a result, the length of a portion of the tape 12 which is taken up by the winding reel 131 is less than the movement of the control dial 134 (i.e., displacement along the outer periphery of the control dial 134) by an amount corresponding to the ratio between the radii. Accordingly, it is easy to apply a small displacement to the tape 12.

The tape 12 runs in the space 135 formed between the half casings 111 and 112 from the supply reel 130 to the winding reel 131 while being guided by pin-shaped tape guides 136. A portion of the tape 12 in the middle way of the above passage runs around a head element 123 which will be explained below.

The insertion portion 120 has a half-split structure as the tool body 110, and the insertion portion 120 is formed by integrating half insertion portions 120a and 120b which are formed integrally with the half casings 111 and 112, respectively, when the half casings 111 and 112 is assembled.

On both outer sides of the insertion portion 120 in the direction of width, there are provided engagement recesses 121 which are adapted to engage the engagement fingers 153 of the adapter 150 when the insertion portion 120 is inserted into the adapter 150, and recesses 122 which are adapted to prevent interference with the guide pins 145 projecting from the connecting end face 141a of the optical connector 140.

The leading portion 121a of the engagement recess 121 (i.e., a portion closer to the tip of the insertion portion 120, or the left portion in FIGS. 1A and 1B) is slanted so that the engagement finger 153 can be removed from the engagement recess 121 over the leading portion 121a with a relatively small effort when the insertion portion 120 is drawn in the direction of drawing (i.e., toward the right in FIG. 1B) from a state in which the engagement finger 153 of the adapter 150 engages the engagement recess 121.

The head element 123 around which the tape 12 runs is accommodated in the insertion portion 120. The head element 123 is generally formed, as shown in FIG. 5 as viewed in plan view, in a triangular or trapezoidal shape, elongated in the direction of insertion, and the front tip thereof (the left portion thereof in FIG. 5) as viewed in the direction of insertion is formed as an abutting surface 124.

The head element 123 is supported in such a manner that the rotation thereof about a support axis 125, which is supported between the half insertion portions 120a and 120b, in the vertical direction is possible so that the direction of the abutting surface 124 with respect to the direction of insertion of the insertion portion 120 is adjustable.

In the head element 123, the thickness of the abutting surface 124 disposed in forward side is made greater than that of a portion thereof accommodated in the insertion portion 120. As a result, sufficient area is ensured as an abutting area between the abutting surface 124 of the head element 123 and the connecting end face 141a of the optical connector 140, while on the other hand, the tape 12 is prevented from being pressed against the inner wall of the insertion portion 120 when the head element 123 rotates about the support axis 125.

In the front end of the insertion portion 120, there is provided an aperture 126 through which the abutting surface 124 of the head element 123 and a portion of the tape 12 running along the abutting surface 124 are exposed.

Of course, the head element 123 and the tape 12 exposed through the aperture 126 may be covered by a protection cap or cover in order to protect the tape 12 or the like when the cleaning tool 11 is not used, even though such a state is not specifically shown.

An example of the cleaning procedure using the cleaning tool 11 will be explained below.

When the insertion portion 120 of the cleaning tool 11 is inserted through the insertion aperture 151 of the adapter 150, the insertion portion 120 advances into the connector accommodating hole 152 while the outer surface thereof is guided by the inner wall 150a of the adapter 150. When the insertion portion 120 is inserted to a point at which the stoppers 115 contact the peripheral portion 151a of the connector insertion aperture 151, the engagement recesses 121 engage the engagement fingers 153 of the adapter 150, and as a result, the cleaning element 12 is positioned at an appropriate place in the connecting end face 141a (i.e., at the optical fiber holes 141b and the vicinity thereof in this embodiment) so as to be abutted thereto.

Because the head element 123 is rotated about the support axis 125 by the reaction force generated by the abutment between the abutting surface 124 and the connecting end face 141a of the optical connector 140, the abutting surface 124 can be correctly abutted against the connecting end face 141a even if the connecting surface 141a is slanted with respect to the direction of insertion of the insertion portion 120.

Even though the guide pins 145 project from the connecting end face 141a of the optical connector 140, the insertion portion 120 can be accommodated in the connector accommodating hole 152 without having interference with the guide pins 145 since the guide pins 145 are accommodated in the recesses 122 provided in the insertion portion 120. In this case, the interferences between the tape 12 and the guide pins 145 can also be prevented by partitions 122a.

When the control dial 134 is rotated by a predetermined amount, the tape 12 is moved interlocking with the rotation of the winding reel 131, and the connecting end face 141a is wiped by the tape 12 so that dirt such as particles, dust, or oil on the connecting end face 141a is sufficiently wiped off by the tape 12.

Because the movement of the insertion portion 120 in the direction of width during cleaning is restricted by the elastic forces of the engagement fingers 153 engaging the engagement recesses 121, the abutting position of the cleaning element 12 with respect to the connecting end face 141a is prevented from shifting. In addition, because the insertion portion 120 can be held in the adapter 150 with a light effort, workability is superior.

Because the guide pins 145 are accommodated in the recesses 122 which are separated from the cleaning element 12 by the partitions 122a, the interferences between the tape 12 and the guide pins 145 can also be prevented.

Because the dirt which has been wiped off adheres to the tape 12, and moves along the direction of winding by the winding reel 131, and because the used portion of the tape 12 is no longer exposed through the aperture 126 of the insertion portion 120, the dirt will not again adhere to the connecting end face 141a.

Accordingly, the connecting end face 141a can be cleaned to an extreme degree.

After cleaning, when the cleaning too 11 is drawn in the direction opposite to insertion, because the engagement fingers 153 of the adapter 150 are expanded toward the gap 155 by the leading portions 121a of the engagement recesses 121, the engagement fingers 153 disengage from the engagement recesses 121, and the insertion portion 120 can be easily withdrawn.

In the above description, the present invention is explained based on the preferred embodiment; however, the present invention is not limited to the above embodiment, and various modifications may be made without departing from the scope of the present invention.

For example, the practical shape of the optical connector cleaning tool is not limited to that in the above embodiment, and the shape may be modified depending on the shape of an optical connector to which the cleaning tool is applied.

Next, the case in which the cleaning tool is applied to an optical connector having a different shape will be explained below with reference to FIGS. 8A, 8B, 9A, and 9B.

Figure 8A:
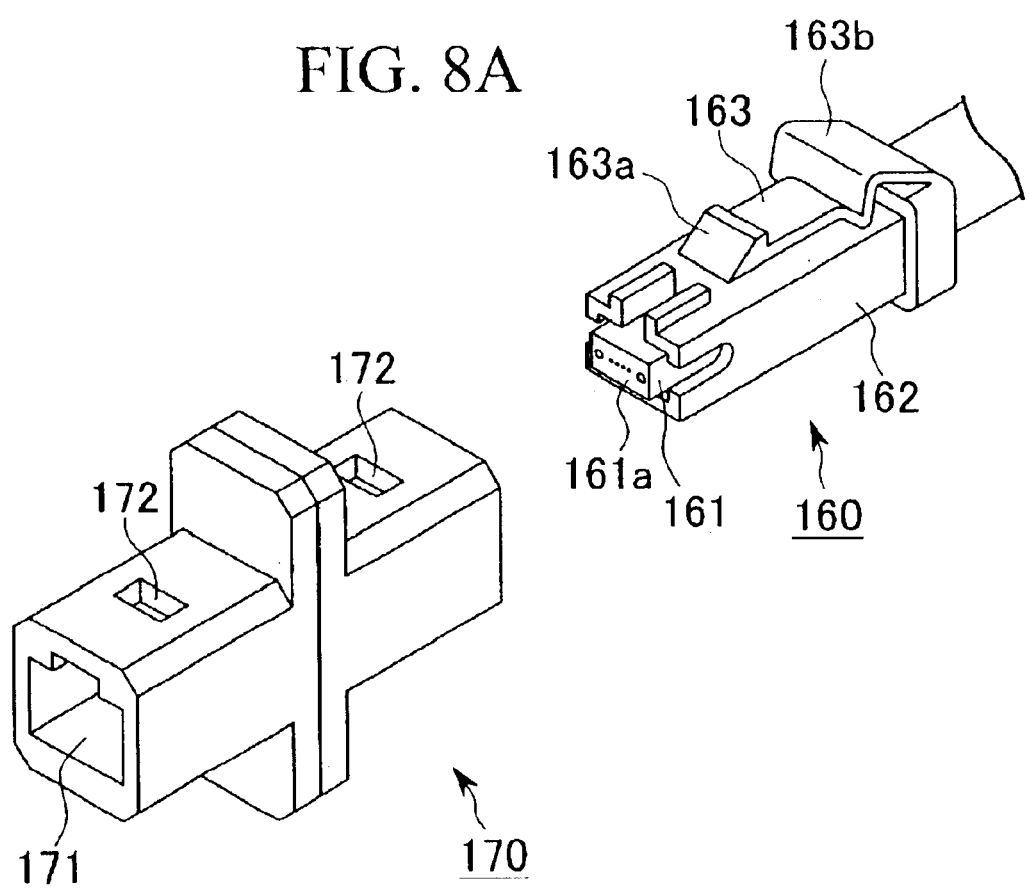
FIG. 8A is a perspective view showing another optical connector and connector housing to which an alternative optical connector cleaning tool is applied.
Figure 8B:
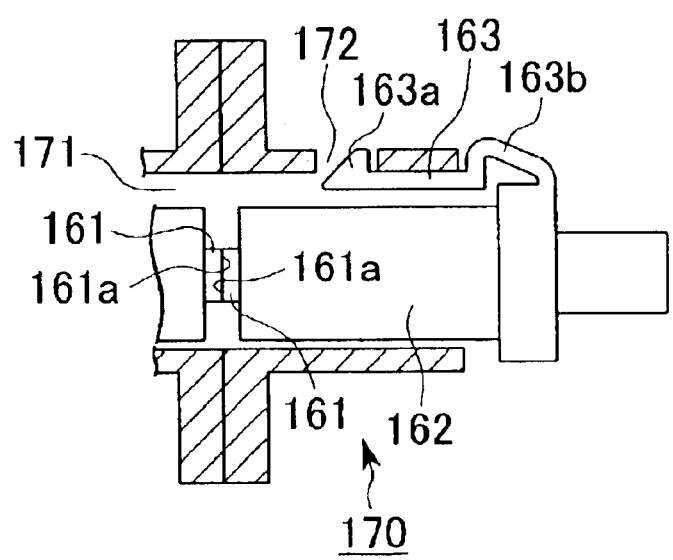
FIG. 8B is a cross-sectional view showing a state in which these optical connector and connector housing are optically connected to each other.

In FIGS. 8A and 8B, reference symbol 160 indicates an optical connecter generally known as MT-RJ type optical connector. When optical connectors 160 are inserted through either ends of an optical connector adapter 170 (adapter), ferrules 161 of the optical connectors 160 are abutted to each other, and optical fibers fixed in the ferrules 161 are optically connected. The ferrule 161 may be of the above MT type optical connector. In this case, two ferrules 161 can be connected to each other in an abutting manner while being accurately positioned by inserting guide pins (not shown) projecting from a connecting end face 161a of one of the ferrules 161 into guide pin holes 161c formed at either side ends of a connecting end face 161a of the other of the ferrules 161.

The optical connector 160 inserted in the adapter 170 is prevented from being removed in such a manner that an engagement finger 163a, which is formed at the front end of a latch 163 that extends from a housing 162 forwardly in the direction of insertion, engages an engagement hole 172 of the adapter 170 in a disengageable manner. On the other hand, when a lever portion 163b of the latch 163, which is exposed outside the adapter 170, is pressed so as to disengage the latch 163 from the engagement hole 172 of the adapter 170, the optical connector 160 can be removed from the adapter 170.

Figure 9A:
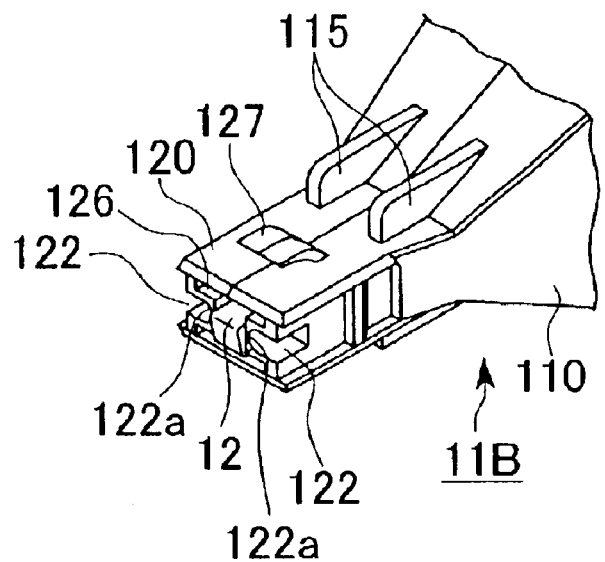
FIG. 9A is a perspective view showing the alternative optical connector cleaning tool.
Figure 9B:
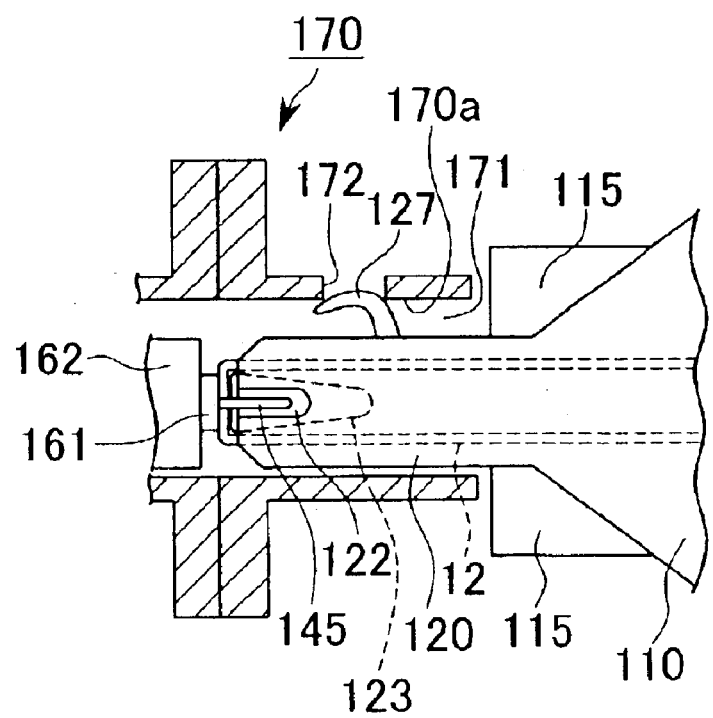
FIG. 9B is a cross-sectional view showing a state in which the alternative optical connector cleaning tool is abutted against the connector housing.

FIGS. 9A and 9B show an example of a cleaning tool 11B which is applicable to cleaning the connecting end face 161a of the optical connector 160 inserted in the adapter 170.

The general structure and general operation of the cleaning tool 11B are the same as in the above first embodiment; therefore, the same reference symbols are applied to the same elements, and duplicated explanation thereof will be omitted.

The insertion portion 120 comprises the head element 123 having the abutting surface 124 around which the cleaning element 12 (tape) runs, and the aperture 126 which opens in the front end of the insertion portion 120 for exposing the head element 123. The outer size of the insertion portion 120 is determined to be slightly less than the size of a connector accommodating hole 171 of the adapter 170.

In either side surfaces of the insertion portion 120, there are provided the recesses 122 for preventing interference between the insertion portion 120 and the guide pins 145 of the optical connector 160. Furthermore, the recesses 122 and the aperture 126 are separated from each other by the partitions 122a.

On the upper surface of the insertion portion 120, there is provided an engagement projection 127 which is engageable with the engagement hole 172 of the adapter 170. When the insertion portion 120 is inserted into the adapter 170, the engagement projection 127 is accommodated in the connector accommodating hole 171 while being pressed against the inner wall 170a of the adapter 170 and being elastically deformed, and then the engagement projection 127 engages the engagement hole 172 while loosing compressive force of the inner wall 170a of the adapter 170 is the engagement hole 172. Moreover, the engagement projection 127 is adapted to elastically deform and to disengage from the engagement hole 172 when the insertion portion 120 is drawn from the adapter 170 in the direction of withdrawing.

The cleaning procedure for the connecting end face 161a of the optical connector 160 inserted in the adapter 170 using the cleaning tool 11B is similar to that using the cleaning tool 11 in the first embodiment, and first, the insertion portion 120 of the cleaning tool 11B is inserted into the connector accommodating hole 171 of the adapter 170 so that the engagement projection 127 of the insertion portion 120 engages the engagement hole 172 of the adapter 170. As a result, a portion of the tape 12 located at projecting end of the insertion portion 120 is positioned and abutted against the connecting end face 161a, and contact of the tape 12 with the connector accommodating hole 171 can be prevented.

Figure 10:
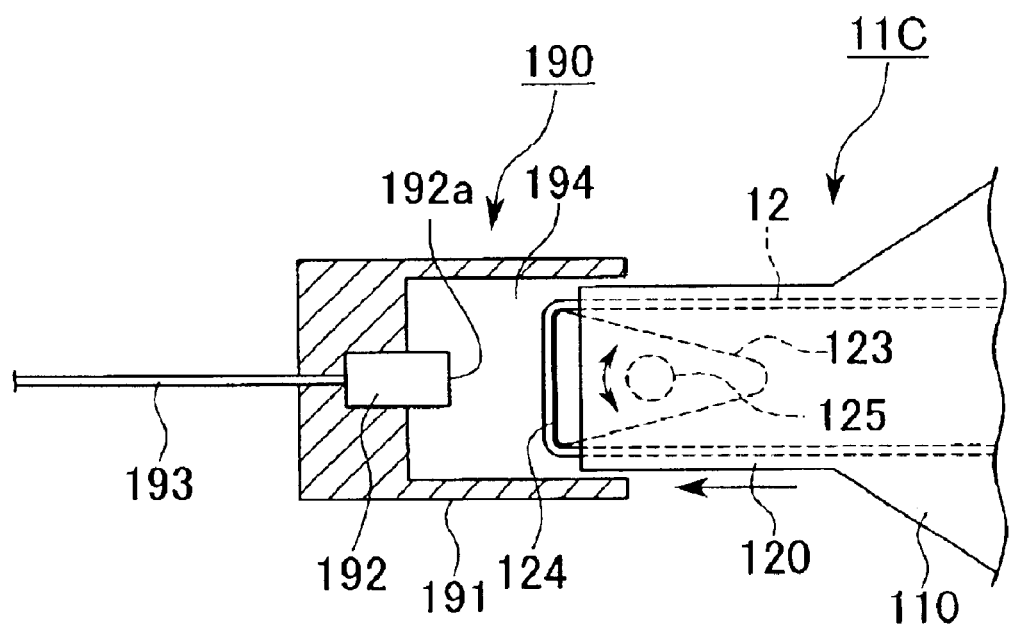
FIG. 10 is a cross-sectional view further showing the alternative optical connector cleaning tool in a state in which the alternative optical connector cleaning tool is going to be inserted toward an optical connector in an optical connector receptacle.

As another example, an optical connector receptacle may be applicable as a connector housing. As shown in FIG. 10, the optical connector receptacle 190 as an example is assembled such that a ferrule 192 attached to the end of an optical fiber 193 is installed in a housing 191.

An optical connector cleaning tool 11C may be used whose cleaning element 12 can be positioned and abutted against a connecting end face 192a of the ferrule 192 by inserting the insertion portion 120 into a connector accommodating hole 194 of the optical connector receptacle 190. In this embodiment, the ferrule 192 itself functions as an optical connector.

Next, the second embodiment of the present invention will be explained below with reference to the drawings.

FIGS. 11A, 11B, and 11C are drawings showing an optical connector cleaning tool of the second embodiment, in particular, FIG. 11A is a perspective view showing the entirety thereof, FIG. 11B is a side view, and FIG. 11C is a partially enlarged perspective view showing a tip portion of the cleaning tool.

Figure 12:
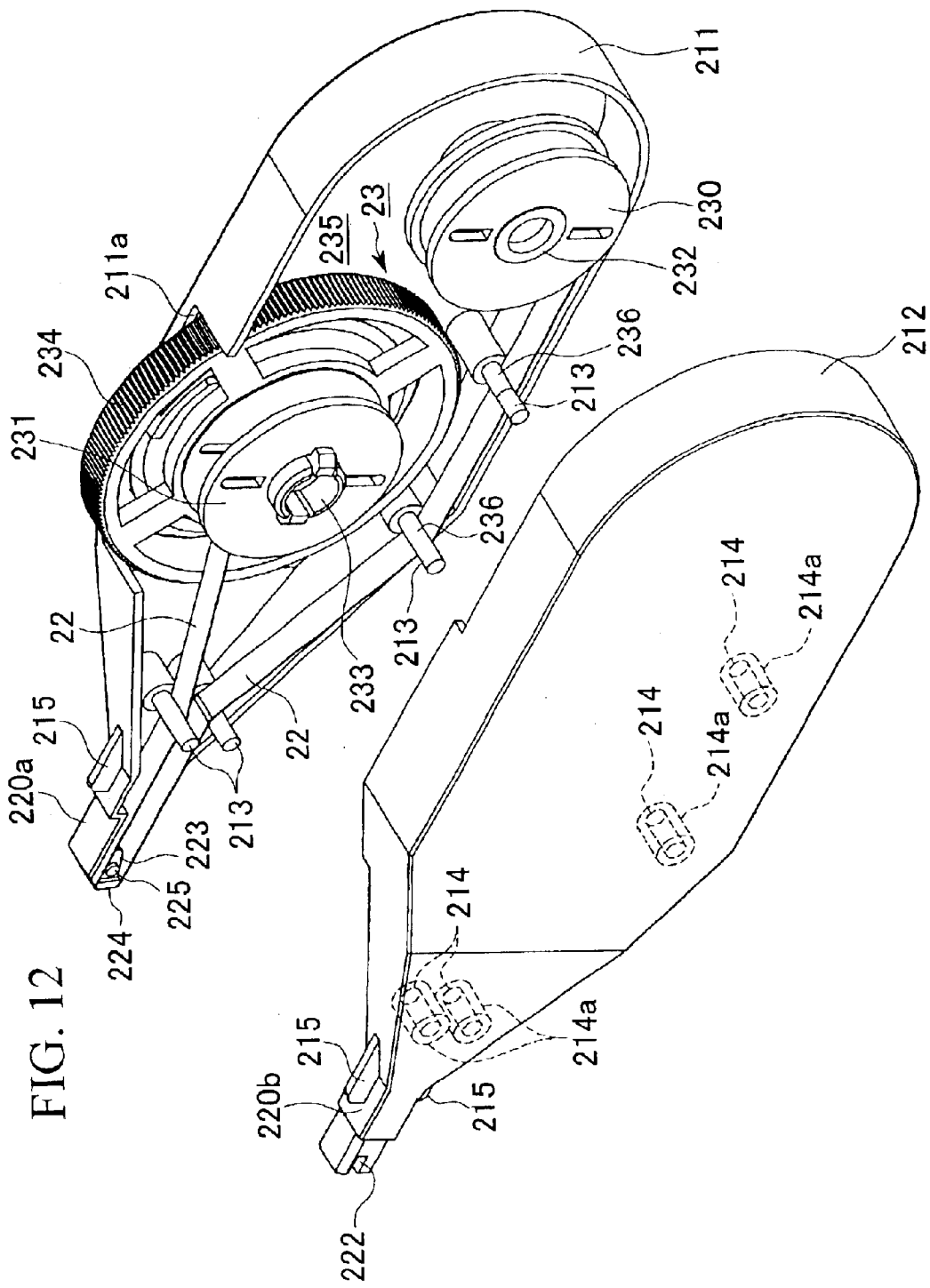
FIG. 12 is a perspective view showing a state in which the tool body of the above cleaning tool is split into halves.

FIG. 12 is a perspective view showing a state in which the tool body of the cleaning tool is split into halves.

Figure 13A:
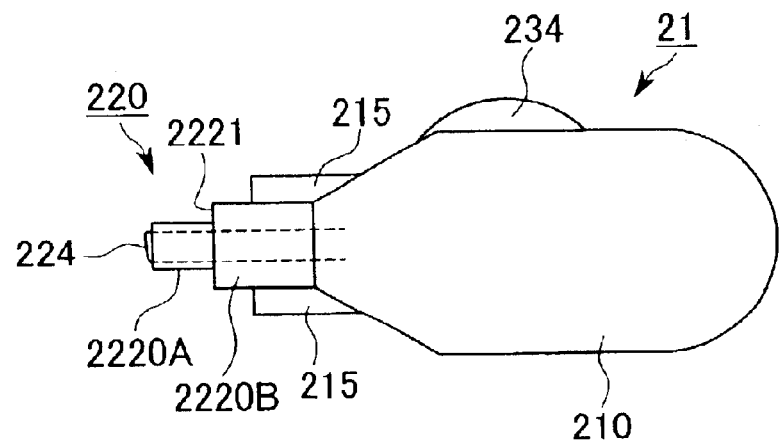
FIG. 13A is a schematic side view showing the above cleaning tool.

FIG. 13A is a schematic side view showing the above cleaning tool.

Figure 13B:
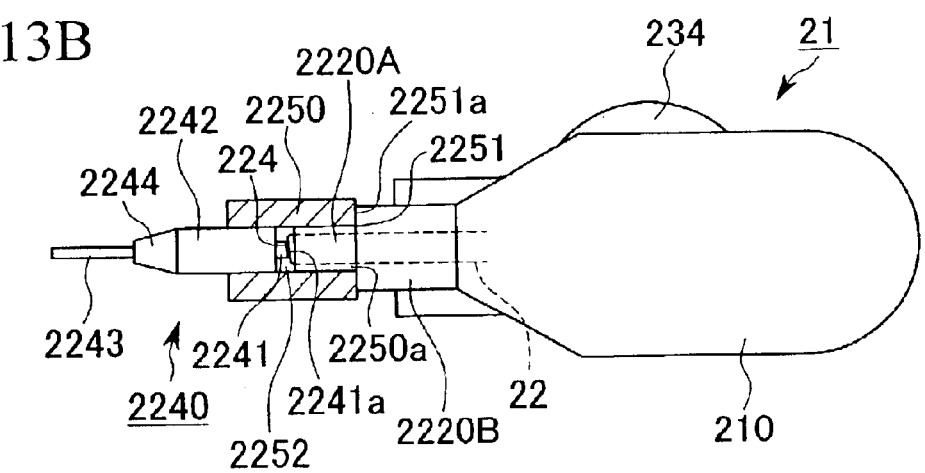
FIG. 13B is a side view showing a state in which the insertion portion of the cleaning tool is inserted into a connector housing while being positioned by a first insertion unit.
Figure 13C:
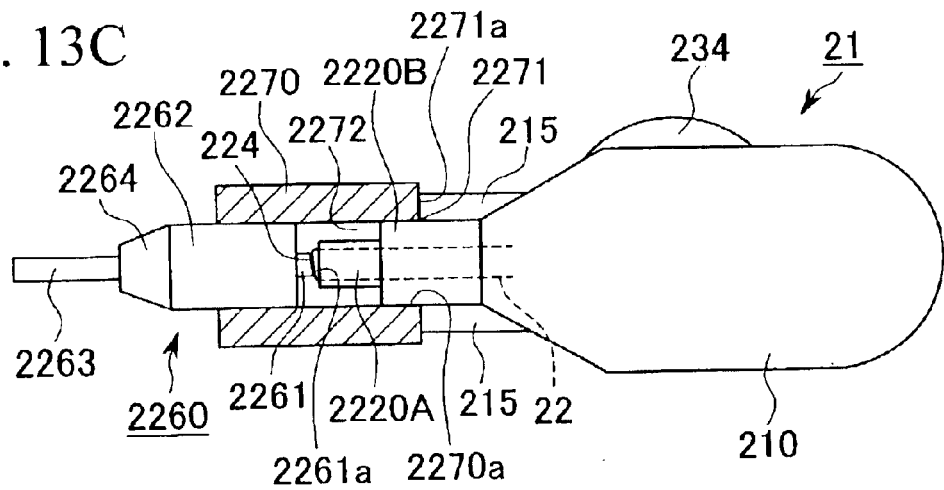
FIG. 13C is a side view showing a state in which the insertion portion of the cleaning tool is inserted into another connector housing while being positioned by a second insertion unit.

FIG. 13B is a side view showing a state in which the insertion portion of the cleaning tool is inserted into a connector housing while being positioned by a first insertion unit, and FIG. 13C is a side view showing a state in which the insertion portion of the cleaning tool is inserted into another connector housing while being positioned by a second insertion unit.

Figure 14:
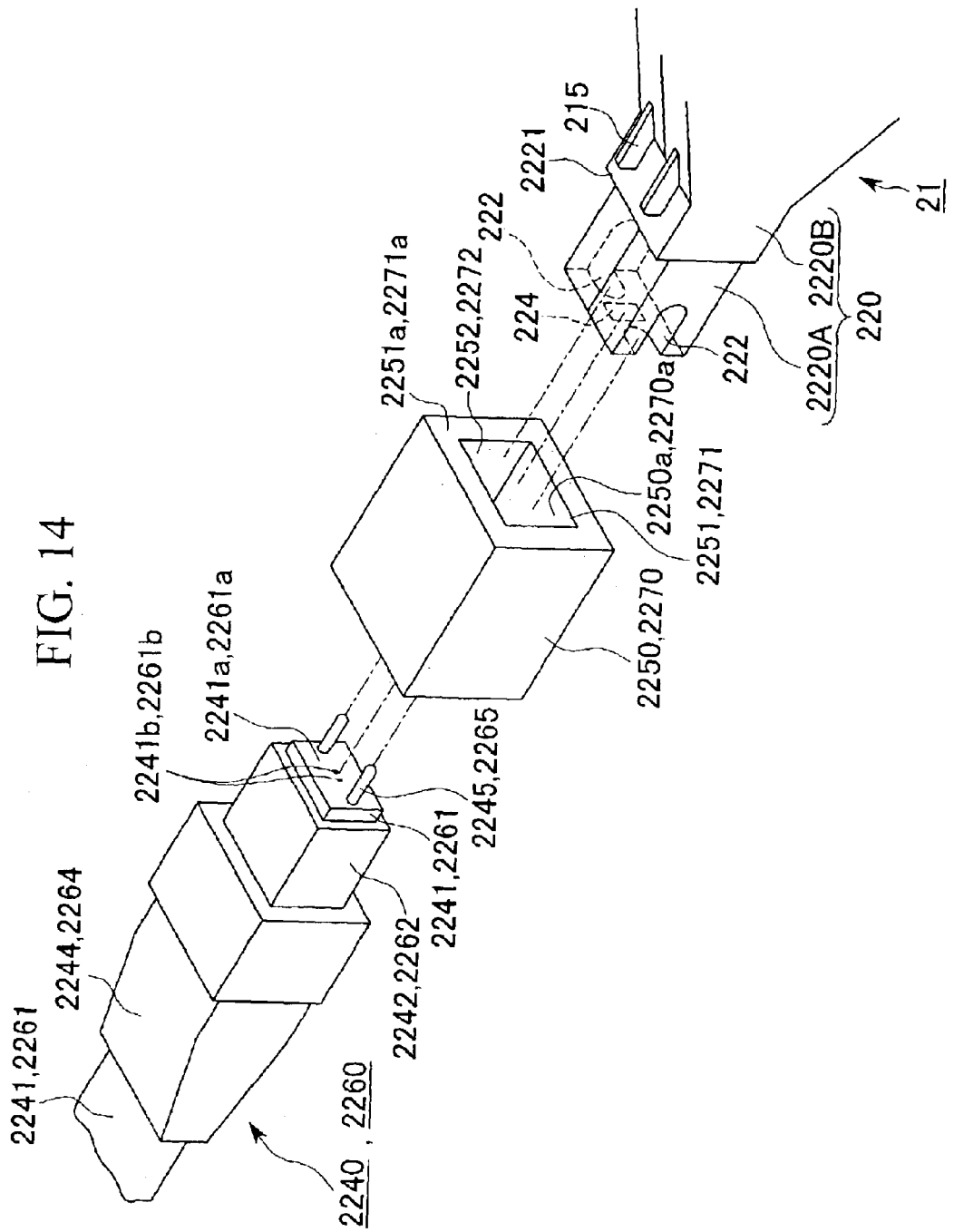
FIG. 14 is a perspective view explaining a state in which the insertion portion of the cleaning tool is going to be abutted against an optical connector to be cleaned.

FIG. 14 is a perspective view explaining a state in which the insertion portion of the cleaning tool is going to be abutted against an optical connector to be cleaned.

Figure 15A:
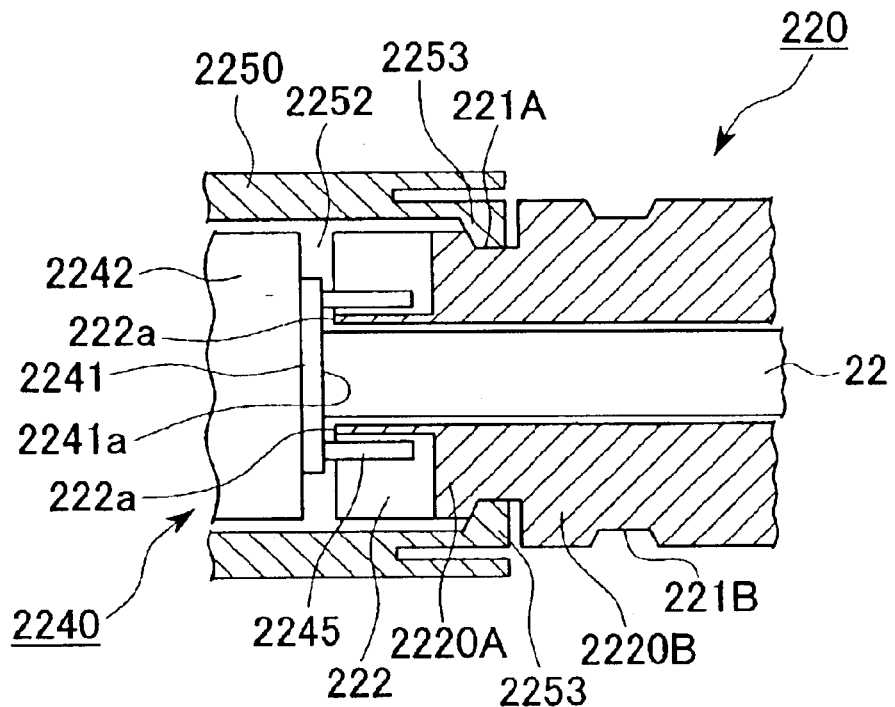
FIG. 15A is a horizontal side view showing a state in which the insertion portion of another cleaning tool is inserted into a connector housing while being positioned by a first insertion unit.
Figure 15B:
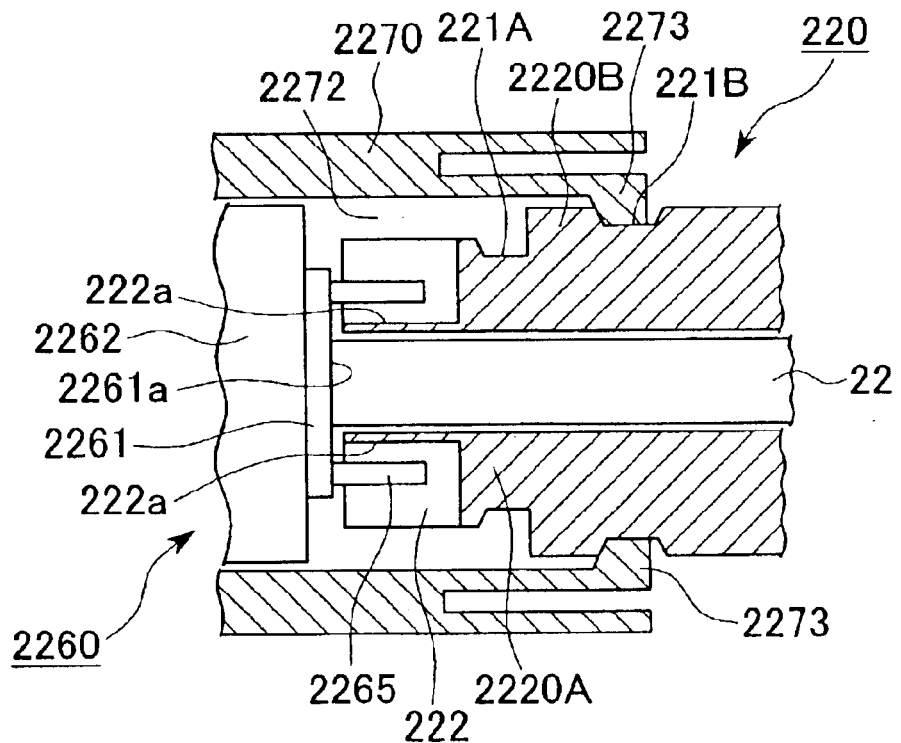
FIG. 15B is a horizontal side view showing a state in which the insertion portion of the cleaning tool is inserted into another connector housing while being positioned by a second insertion unit.

FIG. 15A is a horizontal side view showing a state in which the insertion portion of another cleaning tool is inserted into a connector housing while being positioned by a first insertion unit, and FIG. 15B is a horizontal side view showing a state in which the insertion portion of the cleaning tool is inserted into another connector housing while being positioned by a second insertion unit.

As shown in FIGS. 13A, 13B, 13C, 14, 15A, and 15B, optical connectors 2240 and 2260 (plugs) and connector housings 2250 and 2270 (adapters) to which a cleaning tool 21 of the present embodiment is applied are MPO (Multifiber Push On) type optical connectors specified in JIS C 5982, IEC 61754-7, etc., and optical connectors generally known as Mini-MPO type optical connectors which have substantially the same shape as MPO type optical connectors, in which optical connector ferrules or the like are made smaller than that specified for MPO type optical connectors.

In this embodiment, the optical connector 2240 and the adapter 2250 are Mini-MPO type optical connectors, and the optical connector 2260 and the adapter 2270 are MPO type optical connectors.

As shown in FIG. 14, the optical connectors 2240 and 2260 are optical connector plugs formed by accommodating optical connector ferrules 2241 and 2261 (hereinafter simply referred to as a ferrule) end portions of plastic housings 2242 and 2262 having sleeve-shape, respectively, so as to have generally shallow sections.

The ferrule 2261 applied to the optical connector 2260 which is an MPO type optical connector is an MT (Mechanically Transferable) type optical connector ferrule specified in JIS C 5981 or the like. The ferrule 2241 applied to the optical connector 2240 which is a Mini-MPO type optical connector is a ferrule generally known as an Mini-MT type ferrule which is smaller than an MT type ferrule.

In the following description, a direction corresponding to the short sides of the shallow shape of the optical connectors 2240 and 2260 (the vertical direction in FIGS. 13A, 13B, and 13C) may be referred to as the direction of thickness, and a direction corresponding to the long sides (the direction perpendicular to the planes of FIGS. 13A, 13B, and 13C) may be referred to as the direction of width. Furthermore, corresponding to the directions of thickness and width of the optical connectors 2240 and 2260, the terms of the directions of thickness and width may also be used for explaining the connector housings 2250 and 2270 to be connected to the optical connectors 2240 and 2260, and for explaining an insertion portion 220 of the cleaning tool 21.

Predetermined number of optical fiber holes 2241b and 2261b are opened, in an aligned manner, to connecting end faces 2241a and 2261a of the ferrules 2241 and 2262 of the optical connectors 2240 and 2260. The end of optical fibers 2243 and 2263 are disposed through the optical fiber holes 2241b and 2263b so as to be connectable to another optical fiber in an abutting manner, and the optical fibers 2243 and 2263 run through the optical connectors 2240 and 2260 and extend from the rear ends of the optical connectors 2240 and 2260.

The optical fiber 2243 and 2263 extending from the rear ends of the optical connectors 2240 and 2260 are housed in boots 2244 and 2264 provided on the housings 2242 and 2262 at the rear ends thereof as viewed in the direction of connection so as not to be sharply bent at the vicinity of the rear end of the optical connectors 2240 and 2260.

The optical fibers 2243 and 2263 are not limited to a specific one, but may be, for example, a single coated optical fiber, a multicore coated optical fiber, an optical fiber code in which coated optical fibers are surrounded by a tube, or the like. In the case of a coated optical fiber or an optical fiber code, the end thereof is formed by inserting a bare optical fiber, which is exposed by removing coating at the end portion thereof, into the optical fiber holes 2241b and 2261b of the ferrules 2241 and 2261 so as to be connectable in an abutting manner.

The adapter 2250 and 2270 are generally formed in a sleeve shape, and are adapted so that the optical connectors 2240 and 2260 inserted through the connector insertion apertures 2251 and 2271 disposed at either ends of the adapter 2250 and 2270 are accommodated in connector accommodating holes 2252 and 2272 formed in the adapters 2250 and 2270.

When two optical connectors 2240 and 2240 or 2260 and 2260 are inserted into the adapter 2250 or 2270 through the connector aperture 2251 or 2271, the respective ferrules 2241 and 2241 or 2261 and 2261 are abutted to each other, whereby the optical fibers 2243 and 2243 or 2263 and 2263, each end of which is formed as the ferrule 2241 or 2261, are optically connected.

The adapters 2250 and 2270 comprise elastic engagement fingers 2253 and 2273 which extend from the adapters 2250 and 2270 toward the connector insertion apertures 2251 and 2271 along the inner walls 2250a and 2270a thereof. The elastic engagement fingers 2253 and 2273 are adapted to engage engagement recesses (not shown) formed in the both side surfaces, disposed in the direction of width of the housings 2242 and 2262 of the optical connectors 2240 and 2260.

The cleaning tool 21 of the present embodiment, which is applicable to cleaning of the connecting surfaces 2241a and 2261a of the above connectors 2240 and 2260, comprises a tool body 210 which is generally formed like a casing, and which accommodates a cleaning element 22 therein, an insertion portion 220 which projects from the tool body 210, and a driving section 23 which moves the cleaning element 22.

The tool body 210 is made of plastic or the like in a half-split structure, in which a first half casing 211 and a second half casing 212 face each other, and the first and second half casings 211 and 212 are integrated by fitting a engagement pins 213 projecting inside the first half casing 211 into engagement holes 214 formed in bosses 214a projecting inside the second half casing 212.

In this embodiment, the cleaning element 22 is a tape, and the tape 22 is not limited to a specific one, but may be an appropriate and known clean cloth processed into a tape shape, for example, a tape fabricated by weaving ultrafine fabric made of polyester, nylon, etc., may be used.

The width of the tape 22 is determined so that the all end faces and peripheries thereof of the optical fibers, which are exposed at each of the connecting end faces 2241a and 2261a of the optical connectors 2240 and 2260, can be wiped at one time. As shown in FIGS. 15A and 15B, the movement of the tape 22 in the direction of width is restricted by the inner walls of the insertion portion 220, whereby the lateral shift of the tape 22 is prevented.

In an accommodating space 235 of the half casings 211 and 212, there is provided a tape feeding section as a driving section 23.

The tape feeding section 23 comprises a supply reel 230 on which the tape 22 is wound, a winding reel 231 for retrieving the tape 22 in a wound manner after the tape 22 is used, and a control dial 234 for controlling movement of the tape 22.

On the inside surface (facing the accommodating space 235) of the first half casing 211, there are provided a supply reel support axis 232 on which the supply reel 230 is mounted in a rotatable manner, and a winding reel support axis 233 on which the winding reel 231 is mounted in a rotatable manner.

On the outer periphery of the winding reel support axis 233, the control dial 234 is mounted coaxially with the winding reel 231.

A portion of the control dial 234 is exposed outside of the tool body 210 through a window 211a formed in the side surface of the first half casing 211. When the control dial 234 is rotated by hand or the like in a predetermined direction, the winding reel 231 is rotated so as to take up the tape 22, while on the other hand, the unused portion of the tape 22 is fed from the supply reel 230. Because the window 211a opens in the side surface of the tool body 210, it is easy to operate the control dial 234 by fingers of a hand with which the cleaning tool 21 is held even when the cleaning tool 21 is held by the same hand.

The radius of the control dial 234 is determined to be greater than that of the winding reel 231. As a result, the length of a portion of the tape 22 which is taken up by the winding reel 231 is less than the movement of the control dial 234 (i.e., displacement along the outer periphery of the control dial 234) by an amount corresponding to the ratio between the radii. Accordingly, it is easy to apply a small displacement to the tape 22.

The tape 22 runs in the space 235 formed between the half casings 211 and 212 from the supply reel 230 to the winding reel 231 while being guided by pin-shaped tape guides 236. A portion of the tape 22 in the middle way of the above passage runs around a head element 223 which will be explained below.

The insertion portion 220 comprises insertion units 2220A and 2220B which are formed as two steps on a portion projected from the tool body 210.

As shown in FIG. 13B, the first insertion unit 2220A is formed so that, when the first insertion unit 2220A is inserted into the adapter 2250, the first insertion unit 2220A is positioned with respect to the inner wall 2250a of the adapter 2250 while a portion of the tape 22 runs along an abutting surface 224 located at the tip of the insertion portion 220, which will be explained below, is positioned and abutted against the connecting end face 2241a of the optical connector 2240 accommodated in the adapter 2250.

Moreover, as shown in FIG. 13C, the second insertion unit 2220B is formed so that, when the second insertion unit 2220B is inserted into the adapter 2250 with the first insertion unit 2220A, the second insertion unit 2220B is positioned with respect to the inner wall 2270a of the adapter 2270 while a portion of the tape 22 runs along an abutting surface 224 located at the tip of the insertion portion 220 is positioned and abutted against the connecting end face 2261a of the optical connector 2260. More specifically, the first insertion unit 2220A is formed such that the first insertion unit 2220A is insertable to the adapter 2270 to which the second insertion unit 2220B is to be inserted, which is located at a rear portion of the insertion portion 220 as viewed in the direction of insertion (i.e., located at a portion opposite to the tip portion).

The tool body 210 is formed in a shape converging toward the insertion portion 220, and has stoppers 215 at connecting area to the insertion portion 220. As shown in FIG. 13C, the stoppers 215 are provided to prevent the first insertion unit 2220A from being too deeply inserted into the connector accommodating hole 2252 of the adapter 2250, when the second insertion unit 2220B is inserted into the connector accommodating hole 2272 of the adapter 2270, in such a manner that the stoppers 215 abut against the peripheral portion 2271a of the connector insertion aperture 2271 of the adapter 2270.

As shown in FIG. 13B, a leading end portion 2221 of the second insertion unit 2220B is formed so as to abut against the peripheral portion 2251a of the connector insertion aperture 2251 of the adapter 2250 when the first insertion unit 2220A is inserted into the connector accommodating hole 2252 of the adapter 2250, whereby the first insertion unit 2220A is prevented from being too deeply inserted into the connector accommodating hole 2252 of the adapter 2250.

The insertion portion 220 has a half-split structure as the tool body 210 and the insertion portion 220 is formed by integrating half insertion portions 220a and 220b which are formed integrally with the half casings 211 and 112, respectively, when the half casings 211 and 212 is assembled.

The insertion portion 220 comprises recesses 222 which are adapted to prevent interference with projecting elements (guide pins) 2245 and 2265 projecting from the connecting end face 2241a and 2261a of the optical connectors 2240 and 2260. The recesses 222 are provided on both outer sides of the insertion portion 220 in the direction of width.

As shown in FIG. 15A, on both outer sides of the first insertion unit 2220A in the direction of width, there are provided engagement recesses 221A which are adapted to engage the engagement fingers 2253 of the adapter 2250 when the insertion portion 220 is inserted into the adapter 2250.

As shown in FIG. 15B, on both outer sides of the second insertion unit 2220B in the direction of width, there are provided engagement recesses 221B which are adapted to engage the engagement fingers 2273 of the adapter 2270 when the insertion portion 220 is inserted into the adapter 2270.

The leading portions of the engagement recesses 221A and 221B (i.e., portions closer to the tip of the insertion portion 220, or the left portion in FIGS. 15A and 15B) are slanted, whereby the engagement fingers 2253 and 2273 can be respectively removed from the engagement recesses 221A and 221B over the leading portions of the engagement recesses 221A and 221B with a relatively small effort when the insertion portion 220 is drawn in the direction of drawing (i.e., toward the right in FIGS. 15A and 15B) from a state in which the engagement finger 2253 and 2273 of the adapters 2250 and 2270 engage the engagement recesses 221A and 221B, respectively.

The head element 223 around which the tape 22 runs is accommodated in the insertion portion 220. The head element 223 is generally formed in a triangular or trapezoidal shape, elongated in the direction of insertion, and the front tip thereof as viewed in the direction of projection is formed as an abutting surface 224.

The head element 223 is supported in such a manner that the rotation thereof about a support axis 225, which is supported between the half insertion portions 220a and 220b, in the vertical direction, is possible so that the direction of the abutting surface 224 with respect to the direction of insertion of the insertion portion 220 is adjustable.

In the head element 223, the thickness of the abutting surface 224 disposed in forward side is made greater than that of a portion thereof accommodated in the insertion portion 220. As a result, sufficient area is ensured as an abutting area between the abutting surface 224 of the head element 223 and the connecting end faces 2241a and 2261a of the optical connectors 2240 and 2260, while on the other hand, the tape 22 is prevented from being pressed against the inner wall of the insertion portion 220 when the head element 223 rotates about the support axis 225.

In the front end of the insertion portion 220, there is provided an aperture 226 through which the abutting surface 224 of the head element 223 and a portion of the tape 22 running along the abutting surface 224 are exposed.

Of course, the head element 223 and the tape 22 exposed through the aperture 226 may be covered by a protection cap or cover in order to protect the tape 22 or the like when the cleaning tool 21 is not used, even though such a state is not specifically shown.

An example of the cleaning procedure using the cleaning tool 21 will be explained below.

In order to clean the connecting end face 2241a of the optical connector 2240 accommodated in the adapter 2250, first, as shown in FIG. 13B, the insertion portion 220 of the cleaning tool 21 is inserted through the insertion aperture 2251 of the adapter 2250, which is located at a portion of the adapter opposite to a portion thereof where the optical connector 2240 is inserted. During the process of insertion, the outer surface of the first insertion unit 2220A is guided by the inner wall of the adapter 2250, and the insertion portion 220 is inserted until the abutting surface 224 located at the tip of the insertion portion 220 abuts against the connecting end face 2241a of the optical connector 2240.

The first insertion unit 2220A is appropriately positioned by the engagement of the engagement recesses 221A with the engagement fingers 2252 of the adapter 2250, and the first insertion unit 2220A is positioned at an appropriate place (i.e., at the optical fiber holes 2241b and the vicinity thereof in this embodiment) so as to be abutted thereto.

Because the head element 223 is rotated about the support axis 225 by the reaction force generated by the abutment between the abutting surface 224 and the connecting end face 2241a of the optical connector 2240, the abutting surface 224 can be correctly abutted against the connecting end face 2241a even if the connecting surface 2241a is slanted with respect to the direction of insertion of the insertion portion 220.

Even though the guide pins 2245 project from the connecting end face 2241a of the optical connector 2240, the insertion portion 220 can be accommodated in the connector accommodating hole 2252 without having interference with the guide pins 2245 since the guide pins 2245 are accommodated in the recesses 222 provided in the insertion portion 220. In this case, the interferences between the tape 22 and the guide pins 2245 can also be prevented by partitions 222a.

In the above state, the leading end portion 2221 of the second insertion unit 2220B is not inserted through the connector insertion aperture 2251, and functions as a stopper; therefore, the first insertion unit 2220A is prevented from being too deeply inserted into the connector accommodating hole 2252.

When the control dial 234 is rotated by a predetermined amount, the tape 22 is moved interlocking with the rotation of the winding reel 231, and the connecting end face 2241a is wiped by the tape 22 so that dirt such as particles, dust, or oil on the connecting end face 2241a is sufficiently wiped off by the tape 22.

Because the movement of the first insertion unit 2220A in the direction of width during cleaning is restricted by the elastic forces of the engagement fingers 2253 engaging the engagement recesses 221A, and because the guide pins 2245 are accommodated in the recesses 222 which are separated from the cleaning element 22 by partitions 222a, the abutting position of the cleaning element 22 with respect to the connecting end face 2241a is prevented from shifting, and the interference between the cleaning element 22 and the guide pins 2245 can also be prevented. In addition, because the insertion portion 220 can be held in the adapter with a light effort, workability is superior.

Because the dirt which has been wiped off adheres to the tape 22, and moves along the direction of winding by the winding reel 231, and because the used portion of the tape 22 is no longer exposed through the aperture 226 of the insertion portion 220, the dirt will not again adhere to the connecting end face 2241a of the optical connector 2240.

Accordingly, the connecting end face 2241a of the optical connector 2240 can be cleaned to an extreme degree. After cleaning, the insertion portion 220 can be removed from the adapter 2250 by drawing the cleaning tool 21 in the direction opposite to insertion.

In the above description, the present invention is explained based on the preferred second embodiment; however, the present invention is not limited to the above embodiment, and various modifications may be made without departing from the scope of the present invention.

For example, the practical shape of the optical connector cleaning tool is not limited to that in the above embodiment, and the shape may be modified depending on the shape of an optical connector to which the cleaning tool is applied. The optical connector cleaning tool of the present invention is applicable to those optical connectors in which optical connection is made by inserting the optical connectors into a connector housing if the insertion portion of the cleaning tool is adapted to be positioned by the inner wall of the connector housing. In other words, the cleaning tool of the present invention is applicable not only to adapters but also to receptacles and jacks.

In the above embodiment, the number of the insertion units is two; however, the number may be three or more. For example, if three insertion units are formed in the insertion portion, which are referred to, as a first insertion unit, a second insertion unit, and a third insertion unit, respectively, in that order from the projecting tip of the insertion portion, and if these insertion units are adapted to be positioned by a first, a second, and a third connector housings, respectively, the first insertion portion is insertable into all of the first, second, and third connector housings. The second insertion unit is insertable into the second and third connector housings. The third insertion unit is only insertable into the third connector housings. In other words, the first connector housing is adapted to accommodate the first insertion unit, the second connector housing is adapted to accommodate the first and second insertion unit, the third connector housing is adapted to accommodate the first to third insertion units. The optical connector cleaning tool can be adapted in such a manner that an effect similar to that in the above embodiment is obtainable.

As the cleaning element, an appropriate and known element such as a swab may be used other than a tape.

In the above embodiment, the insertion portion is formed so as to substantially cover the entire cleaning element except for a portion corresponding to the aperture formed at the tip of the insertion portion; however, the structure of the insertion portion is not limited to the above embodiment. The shape and structure are not limited to those in the above embodiment, but the insertion portion may be formed in a structure such as a frame shape, U-groove-shape, or H-groove-shape in which the side portion thereof is opened as long as the cleaning element is prevented from becoming contaminated by contact with the inner wall of the connector housing when the insertion portion is inserted into the connector housing.

Next, the present invention will be explained in detail below based on the third embodiment.

Figure 16A:
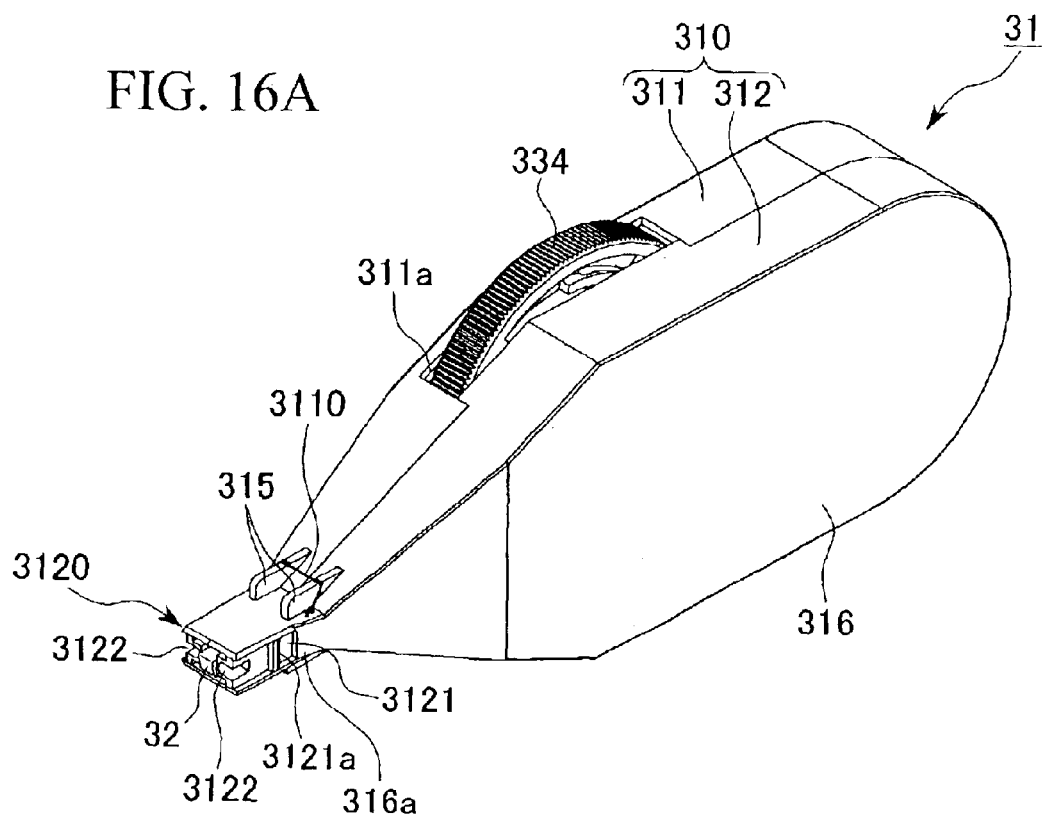
FIG. 16A is a perspective view showing an optical connector cleaning tool according to a third embodiment.
Figure 16B:
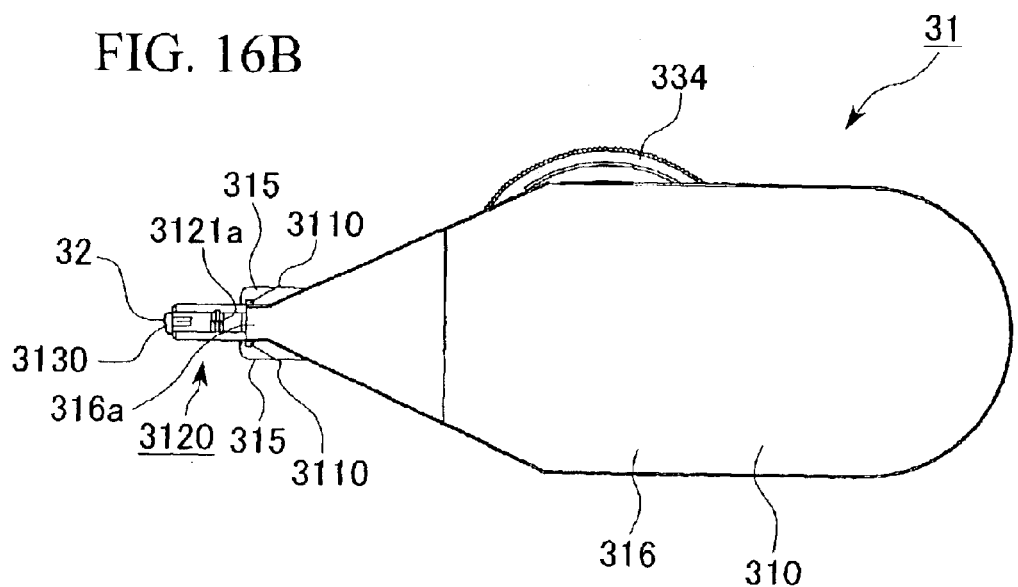
FIG. 16B is a side view of the cleaning tool.
Figure 17:
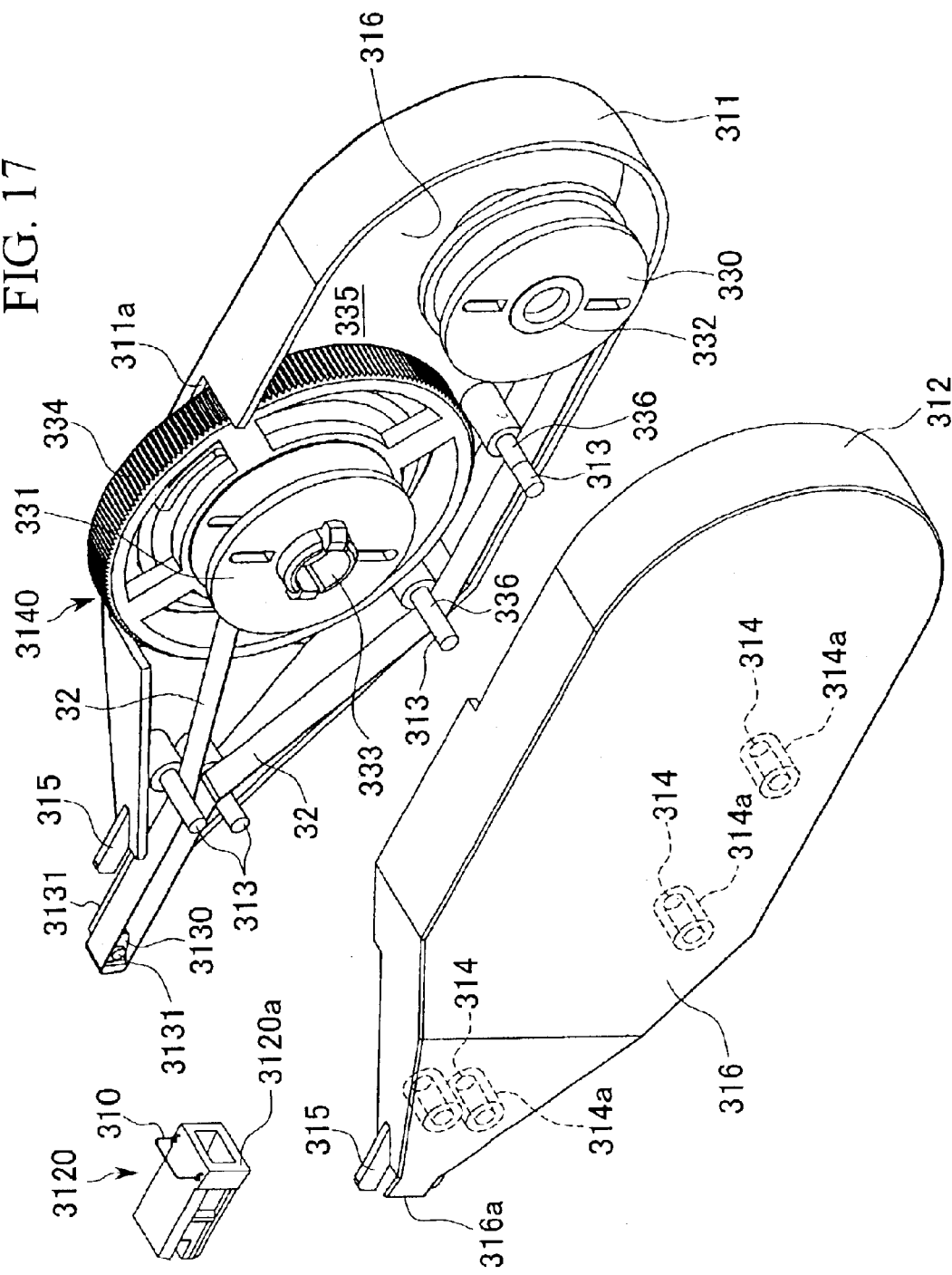
FIG. 17 is a perspective view showing a state in which the tool body of the above cleaning tool is split into halves.

FIGS. 16A and 16B are respectively a perspective view and a side view showing an optical connector cleaning tool according to the third embodiment, and FIG. 17 is a perspective view showing a state in which the tool body of the cleaning tool is split into halves.

Figure 18:
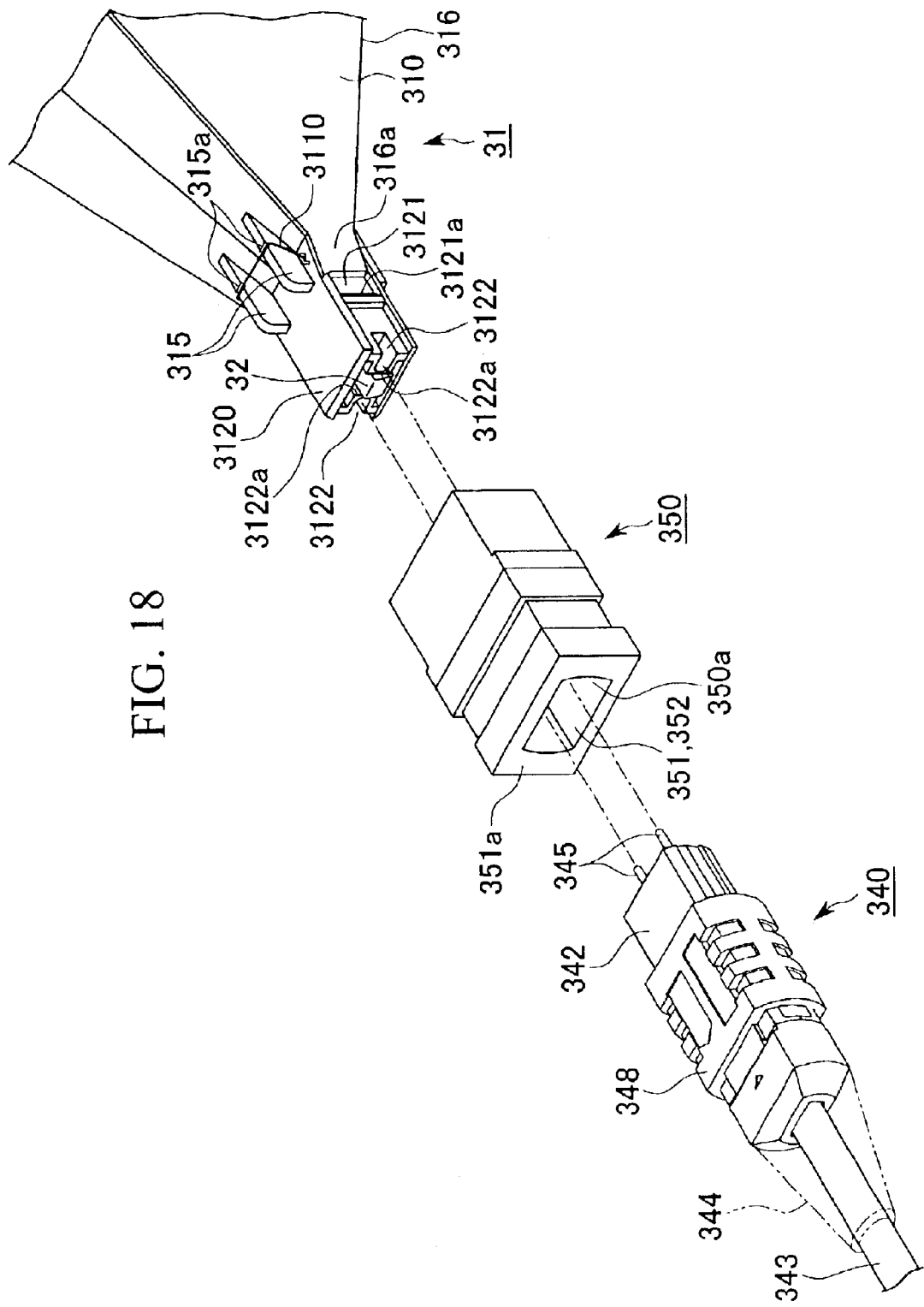
FIG. 18 is an exploded perspective view showing a state in which the tip of the cleaning tool shown in FIGS. 16A and 16B is going to be inserted into a connector insertion hole of a connector housing in which an optical connector is accommodated.
Figure 19:
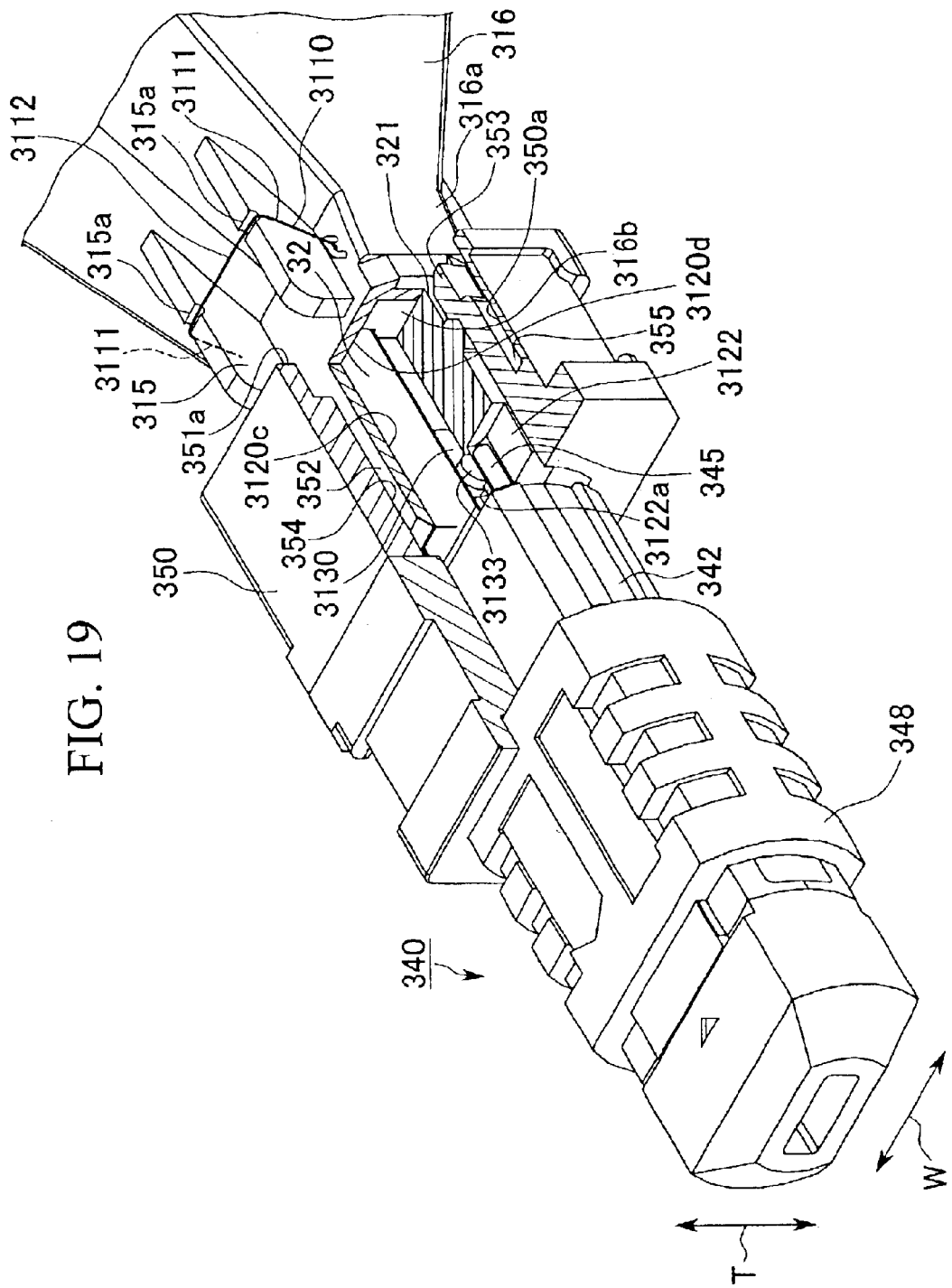
FIG. 19 is a perspective view showing a state in which the tip of the cleaning tool shown in FIGS. 16A and 16B has been inserted into the connector insertion hole of the connector housing in which the optical connector is accommodated.
Figure 20:
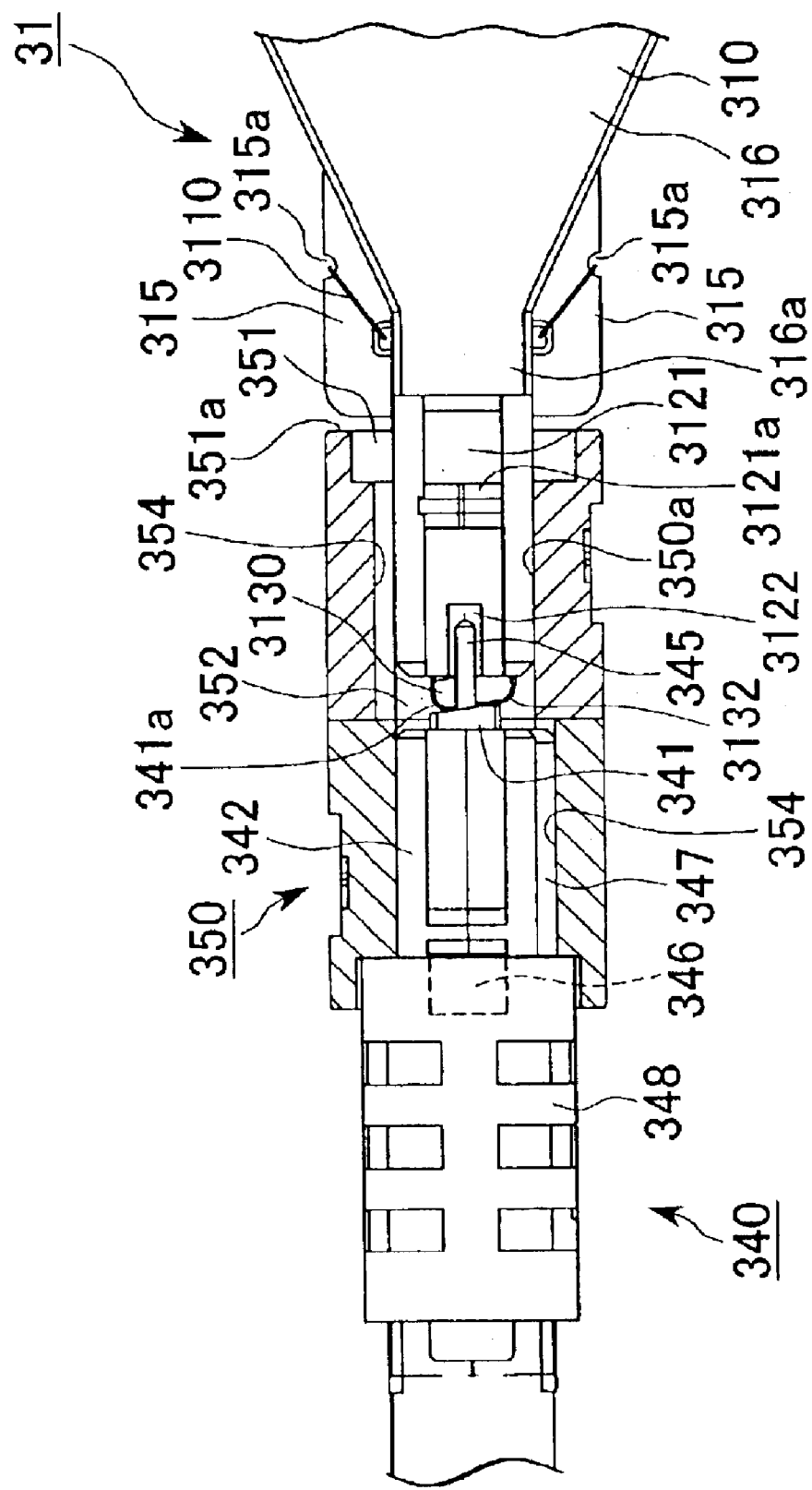
FIG. 20 is a cross-sectional view showing a state in which the tip of the cleaning tool shown in FIGS. 1A and 1B has been inserted into the connector insertion hole of the connector housing in which the optical connector is accommodated.

FIG. 18 is an exploded perspective view showing a state in which an insertion portion of the cleaning tool is going to be inserted into a connector insertion hole of a connector housing in which an optical connector is accommodated, FIG. 19 is a perspective view showing a state in which the insertion portion has been inserted into the connector insertion hole, and FIG. 20 is a cross-sectional view showing a state in which the insertion portion has been inserted into the connector insertion hole.

Figure 21:
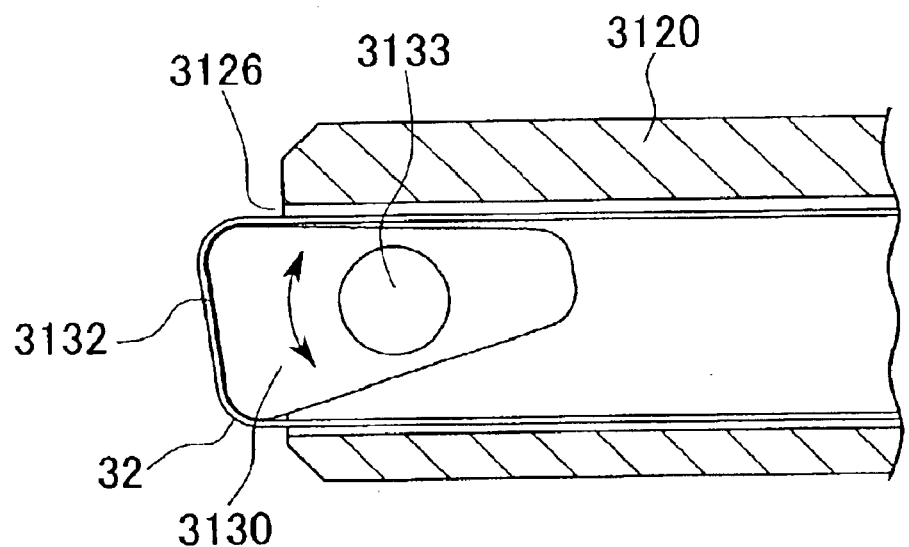
FIG. 21 is a partially enlarged cross-sectional view showing the tip of the cleaning tool.
Figure 22:
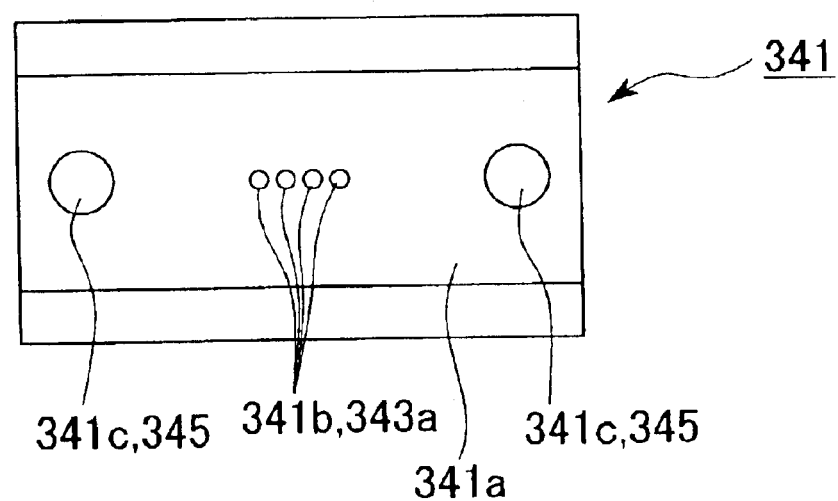
FIG. 22 is a front view showing a connecting end face of the optical connector.

FIG. 21 is a partially enlarged cross-sectional view showing a tip portion of the cleaning tool. FIG. 22 is a front view showing a connecting end face of the optical connector.

As shown in FIGS. 18 to 22, an optical connector 340 (a plug) and a connector housing 350 (an adapter) to which a cleaning tool 31 according to the present embodiment is applied are included in an MPO type optical connector (Multifiber Push On type optical connector specified in JIS C 5982, or IEC 1754-7; hereinafter this may be simply referred to as an adapter).

The optical connector 340 shown in FIG. 18 or the like is an optical connector plug whose cross section is generally formed to be shallow, and in which an MT type optical connector ferrule 341 (Mechanically Transferable type optical connector ferrule specified in JIS C 5982, or IEC 1754-7, hereinafter it may be simply referred to as a ferrule) is housed in the end portion of a plastic housing 342 having a sleeve shape.

Note that, in the following description, a direction corresponding to short sides of the shallow cross section of the optical connector 340 (the vertical direction indicated by the arrow T in FIG. 19) may be referred to as the direction of thickness, and a direction corresponding to long sides thereof (the direction indicated by the arrow W in FIG. 19) may be referred to as the direction of width. In addition, corresponding to the directions of thickness and width of the optical connector 340, the terms of the directions of thickness and width may also be used for explaining a connector housing 350 to be connected to the optical connector 340 and for referring to an insertion portion 3120 of the cleaning tool 31 which is to be inserted into the connector housing 350.

The adapter 350 is generally formed in a sleeve shape, and is adapted so that the optical connectors 340 inserted through the connector insertion apertures 351 disposed at either ends of the adapter 350 are accommodated in a connector accommodating hole 352 formed in the adapter 350. In the adapter 350, the optical connectors 340 inserted into the connector accommodating hole 352 from opposite ends thereof are optically connected to each other.

The connection between two optical connectors 340 is performed by connecting the ferrules 341 in an abutting manner, and more specifically, a pair of ferrules 341 are accurately positioned with respect to each other, and connecting end faces 341a are connected in an abutting manner using a well known guide pin mating type positioning mechanism in which guide pins 345 (i.e., projecting elements, see FIG. 20), which are fixed to the ferrule 341 of one of the optical connectors 340 so as to project from the connecting end face 341a, are inserted into and mated with guide pin holes 341c formed in the ferrule 341 of the other of the optical connectors 340 (see FIG. 22, and note that the guide pin holes 341c formed in the ferrule 341 of the other of the optical connectors 340 indicate open holes). Each of the ferrules 341 forms the end of the optical fiber 343 as a core fiber of a single coated optical fiber or the ends of the optical fibers 343 as core fibers of a multicore coated optical fiber so as to be connectable in an abutting manner, i.e., the end portion (i.e., bare optical fiber or the like, see reference symbol 343a in FIG. 22) of the optical fiber 343 is exposed in the connecting end face 341a of each of the ferrule 341 while being accurately positioned. When two ferrules 341 are connected to each other (i.e., two connecting end faces 341a are connected in an abutting manner), the optical fibers, each of which is exposed in the connecting end face 341a of each of the ferrule 341, are optically connected to each other, whereby the optical fibers 343, each end of which is formed so as to be connectable by means of the optical connector 340.

As shown in FIG. 22, the guide pin holes 341c of the ferrule 341 are opened in either sides of the connecting end face 341a, and optical fiber holes 341b (fine holes) in which the end portions (bare optical fibers or the like) of the optical fibers 343 are housed are accurately formed. In the ferrule 341 in which the guide pins 345 are fixed, the guide pins are accurately positioned in the guide pin holes 341c.

When the optical connector 340 is inserted into the adapter 350, the optical connector 340 is held in the adapter 350 in a stable manner such that engagement recesses 346 (see FIG. 20) formed in either side surfaces, disposed in the direction of width, of a housing 342 engage engagement fingers 353 projected in the adapter 350 in a disengageable manner. The engagement fingers 353 are elastic engagement fingers which extend along the inner wall 350a of the adapter 350 toward connector insertion aperture 351. In addition, on one of the surfaces, disposed in the direction of thickness, of the housing 342 of the optical connector 340, there is provided a key 347 which is formed as a projected rim, and which is adapted to engage a key groove 354 which is formed in a concave shape, and which extends from the connector insertion aperture 351 to an approximate middle point as viewed in the direction of insertion (right-to-left direction in FIG. 20) along the inner wall 350a of the adapter 350.

Moreover, a coupling 348 is installed on the outer surface of the housing 342, which is inserted into a gap 355 (see FIG. 19) formed between the inner wall 350a of the adapter 350 and the engagement fingers 353 after the engagement fingers 353 and the engagement recesses 346 are engaged so as to hold the engagement fingers 353 from outside, and so as to prevent disengagement of the engagement fingers 353 from the engagement recesses 346.

When the optical connector 340 is inserted through the connector insertion aperture 351, the optical connector 340 is accommodated in the connector accommodating hole 352 in such a manner that the movement of the optical connector 340 in a direction other than the direction of insertion is restricted (i.e., the optical connector 340 is positioned) by the engagement of the engagement fingers 353 with the engagement recesses 346, and by the fitting of the key 347 into the key groove 354. When two optical connectors 340 are inserted into the adapter 350 from both ends thereof, the optical connectors 340 are accurately positioned and connected to each other, due to positioning accuracy in a connector accommodating hole 352, in such a manner that the guide pins 345 projecting from the connecting end face 341a of the ferrule 351 of one of the optical connectors 340 are inserted into and mated with the guide pin holes 341c formed in the connecting end face 341a of the ferrule 341 of the other of the optical connectors 340.

A cleaning tool 31 of the present embodiment, which is applicable to cleaning of the connecting surface 341a of the above connector 340, comprises a tool body 310 which is generally formed like a casing, and which accommodates a cleaning element 32 therein, and an insertion portion 3120 which projects from the tool body 310, and which is adapted to be insertable into the connector accommodating hole 352 of the adapter 350.

As shown in FIGS. 16A, 16B, and 17, the tool body 310 is made of plastic or the like in a half-split structure, in which a first half casing 311 and a second half casing 312 face each other, and the first and second half casings 311 and 312 are integrated by fitting engagement pins 313 projecting inside the first half casing 311 into engagement holes 314 formed in bosses 314a projecting inside the second half casing 312.

The tool body 310 is formed in a shape converging toward the insertion portion 3120, and has stoppers 315 at connecting area to the insertion portion 3120. The stoppers 315 are provided to set a insertion limit, when the insertion portion 3120 is inserted into the connector accommodating hole 352 of the adapter 350, in such a manner that the stoppers 315 abut against the peripheral portion 351a of the connector insertion aperture 351. Moreover, the stoppers 315 are provided at four positions in the tool body 310 so as to surround the insertion portion 3120 in order to prevent inclined insertion of the insertion portion 3120 into the connector accommodating hole 352 in such a manner that the stoppers 315 abut against the peripheral portion 351a of the connector insertion aperture 351 through which the insertion portion is inserted.

In this embodiment, the cleaning element 32 is a tape, and the tape 32 is not limited to a specific one, but may be an appropriate and known clean cloth processed into a tape shape, and for example, a tape fabricated by weaving ultrafine fabric made of polyester, nylon, etc., may be used.

The width of the tape 32 is determined so that the all end faces and peripheries thereof of the optical fibers 343a, which are exposed at the connecting end face 341a of the optical connector 340, can be wiped at one time.

On the inside surface (facing an accommodating space 335) of the first half casing 311, there are provided a supply reel support axis 332 on which a supply reel 330, on which the tape 32 is wound, is mounted in a rotatable manner, and a winding reel support axis 333 on which a winding reel 331, which retrieves the tape 32 in a wound manner after the tape 32 is used, is mounted in a rotatable manner.

The supply reel 330, the winding reel 331, and a control section (hereinafter also referred to as a control dial 334) form a tape feeding section 3140 (a driving section) in which the tape 32 is fed from the supply reel 330 and is wound by the winding reel 331 by the operation of the control dial 334.

On the outer periphery of the winding reel support axis 333, the control dial 334 is mounted coaxially with the winding reel 331. A portion of the control dial 334 is exposed outside of the tool body 310 through a window 311a formed in the side surface of the first half casing 311. When the control dial 334 is rotated by hand or the like in a predetermined direction, the winding reel 331 is rotated so as to take up the tape 32, while on the other hand, the unused portion of the tape 32 is fed from the supply reel 330.

The tape 32 runs in the space 335 formed between the half casings 311 and 312 from the supply reel 330 to the winding reel 331 while being guided by pin-shaped tape guides 336. A portion of the tape 32 in the middle way of the above passage runs around a head element 3130 provided in the insertion portion 3120 which will be explained below. The tape 32 runs from the supply reel 330 to the winding reel 331 via an abutting surface 3132 of the head element 3130.

The insertion portion 3120 is a sleeve-shaped housing made of plastic or the like, and the outer shape of the insertion portion 3120 is formed in substantially the same shape as the housing 342 of the optical connector 340 to be inserted into the adapter 350 for connection. The insertion portion 3120 is engaged with an attachment portion 317 (hereinafter also referred to as an engaging attachment portion) which is formed by integrating the half casings 311 and 312 in a portion of the tool body 310 to which the insertion portion 3120 is to contact. As shown in FIGS. 16A, 16B, and 17, the engaging attachment portion 317 is formed by extending portion 316a (hereinafter, it may be simply referred to as an extending plate portion) of a plate of each of the half casings 311 and 312, insertion projections 316b (see FIG. 19) which project toward inside the an extending plate portion 316a, i.e., toward inside the tool body 310, and the stoppers 315.

Figure 23A:
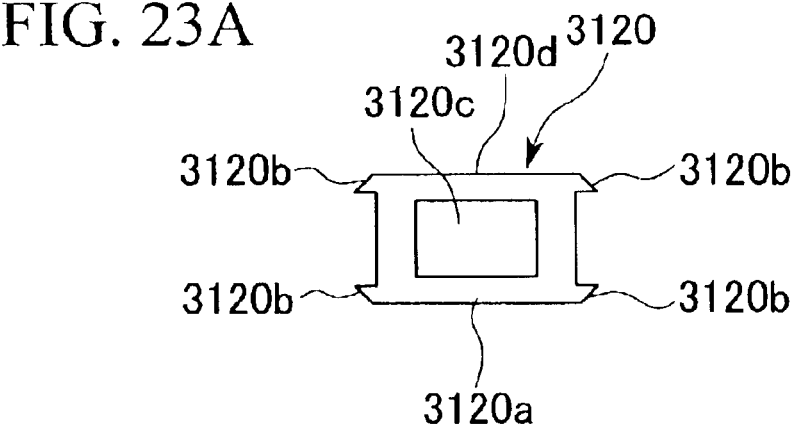
FIGS. 23A and 23B are diagrams showing a relationship between a fitting portion of the insertion portion of the cleaning tool according to the present invention and a fitting portion of the tool body.
Figure 23B:
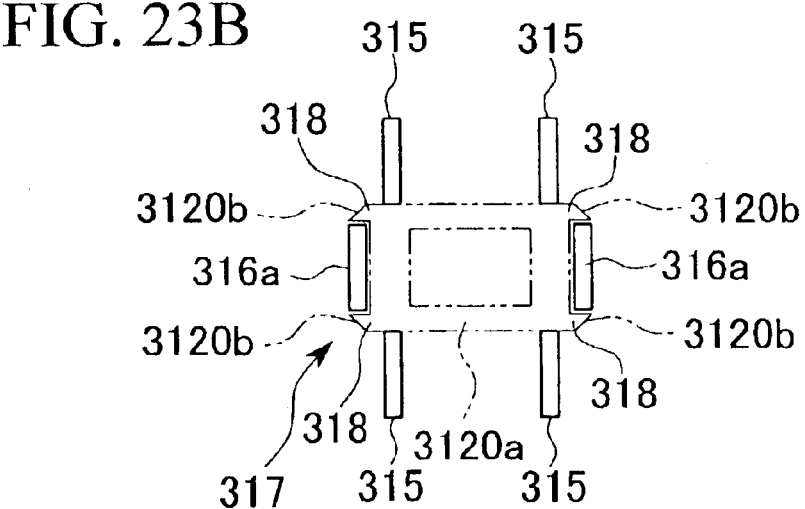

As shown in FIGS. 23A and 23B, the insertion portion 3120 is attached to the tool body 310 in such a manner that engagement attachment portion 3120a of the insertion portion 3120, which projects in the backward direction opposite to the tip portion to be inserted, is inserted into a space surrounded by the pair of extending plate portions 316a, which form an engagement attachment portion 3101, and the stoppers 315 provided in either upper and lower sides. When the insertion portion 3120 is inserted, the insertion portion 3120 functions as an element to aid integration of the pair of half casings 311 and 312 in such a manner that the insertion projections 316b of the half casing 311 and 312 are accommodated in a hole 3120c (a through hole) penetrating the insertion portion 3120. In addition, the insertion portion 3120 is prevented from rotating about an axis in such a manner that rib-shaped projections 3120b, which are provided at four positions around the engaging attachment portion 3120a, are inserted into slit-shaped gaps 318 formed between the extending plates 316b of the attachment portion 317 and the stoppers 315.

Moreover, the insertion portion 3120 is fixed so as not to come off the tool body 310 in such a manner that an engagement element 3110, which is attached to the engaging attachment portion 3120a in a rotatable manner, is engaged with the tool body 310, and more specifically, with the stoppers 315 provided on the tool body 310 in a disengageable manner.

Now, the engagement element 3110 will be more specifically explained.

As shown in FIG. 19 and the like, the engagement element 3110 is made by forming a spring wire into U-shape, and legs 3111 of the U-shape are rotatably supported at portions of the insertion portion 3120, which contact the stopper 315 when the insertion portion 3120 is inserted into the engaging attachment portion 317 of the tool body 310, so that the engagement element 3110 is rotatable about an axis extending in the direction of width of the insertion portion. The insertion portion 3120 is prevented from coming off the tool body 310 by pressing the engagement element 3110 toward the tool body 310 so that an arch portion 3112 of the engagement element 3110 engage the engagement potion (the stoppers 315 in this embodiment) of the tool body 310. The engagement element 3110 is locked such that the arch portion 3112 is fitted into locking grooves 315a each of which is formed in each of the stoppers 315, and the engagement element 3110 can be unlocked, for example, by sufficiently pulling the arch portion 3112 by hand of an operator.

Another engagement element 3110 is also provided on the other side as viewed in the direction of thickness, which also engages the tool body 310 as the other engagement element 3110.

Moreover, when the engagement elements 3110 engage the stoppers 315 projecting from the half casings 311 and 312 that form the tool body 310, the engagement elements 3110 function such that the pair of half casings 311 and 312 from being separated from each other. As a result, the engagement elements 3110 can be held on the tool body 310 in a stable manner.

The engagement elements 3110 and the locking grooves 315a formed in the stoppers 315 function as a fixing mechanism by which the insertion portion 3120 is maintained in a fixed state to the tool body 310; however, the fixing mechanism is not limited to a mechanism comprising the engagement elements 3110 and the locking grooves 315a, and various mechanisms may be employed on condition that locking and unlocking can be performed without opening the tool body 310 in order to facilitate replace of the insertion portion with respect to the tool body 310.

On both outer sides of the insertion portion 3120 in the direction of width, there are provided engagement recesses 3121 which are adapted to engage the engagement fingers 353 of the adapter 350 when the insertion portion 3120 is inserted into the adapter 350, and recesses 3122 which are adapted to prevent interference with the guide pins 345 projecting from the connecting end face 341a of the optical connector 340.

The leading portion 3121a of the engagement recess 3121 (i.e. a portion closer to the tip of the insertion portion 3120, or the left portion in FIGS. 16B and 21) is slanted so that the engagement finger 353 can be removed from the engagement recess 3121 over the leading portion 3121a with a relatively small effort when the insertion portion 3120 is drawn in the direction of drawing (i.e., toward the right in FIGS. 16B and 21) from a state in which the engagement finger 353 of the adapter 350 engages the engagement recess 3121. In this embodiment, the leading portion 3121a is formed by a projection projecting from the side surface of the insertion portion 3120.

The head element 3130 around which the tape 32 runs is accommodated in the insertion portion 3120. The head element 3130 is mounted on a support bar 3131 fixed to one of the half casings 311 and 312 that form the tool body 310, and the head element 3130 is accommodated in the insertion portion 3120 when the insertion portion 3120 is fitted into the tool body. The head element 3130 is generally formed, as shown in FIG. 20 as viewed in plan view, in a triangular or trapezoidal shape, elongated in the direction of insertion of the insertion portion 3120, and the front tip thereof (the left portion thereof in FIG. 20) as viewed in the direction of insertion is formed as an abutting surface 3132. The head element 3130 is supported in such a manner that the rotation thereof about a support axis 3133, which is supported by the support bar 3131, in the vertical direction is possible so that the direction of the abutting surface 3132 with respect to the direction of insertion of the insertion portion 3120 is adjustable.

In the head element 3130, the thickness of the abutting surface 3132 disposed in forward side is made greater than that of a portion thereof accommodated in the insertion portion 3120. As a result, sufficient area is ensured as an abutting area between the abutting surface 3132 of the head element 3130 and the connecting end face 341a of the optical connector 340, while on the other hand, the tape 32 is prevented from being pressed against the inner wall of the insertion portion 3120 when the head element 3130 rotates about the support axis 3133.

In the front end of the insertion portion 3120, there is provided an aperture 3126 through which the abutting surface 3132 of the head element 3130 and a portion of the tape 32 running along the abutting surface 3132 are exposed.

Of course, the head element 3130 and the tape 32 exposed through the aperture 3126 may be covered by a protection cap or cover in order to protect the tape 32 or the like when the cleaning tool 31 is not used, even though such a state is not specifically shown.

An example of the cleaning procedure using the cleaning tool 31 will be explained below.

When the insertion portion 3120 of the cleaning tool 31 is inserted through the insertion aperture 351 of the adapter 350, the insertion portion 3120 advances into the connector accommodating hole 352 while the outer surface thereof is guided by the inner wall 350a of the adapter 350. When the insertion portion 3120 is inserted to a point at which the stoppers 315 contact the peripheral portion 351a of the connector insertion aperture 351, the engagement recesses 3121 engage the engagement fingers 353 of the adapter 350, and as a result, the cleaning element 32 is positioned at an appropriate place in the connecting end face 341a (i.e., at the optical fiber holes 341b and the vicinity thereof in this embodiment) so as to be abutted thereto.

Because the head element 3130 is rotated about the support axis 3133 by the reaction force generated by the abutment between the abutting surface 3132 and the connecting end face 341a of the optical connector 340, the abutting surface 3132 can be correctly abutted against the connecting end face 341a even if the connecting surface 341a is slanted with respect to the direction of insertion of the insertion portion 3120.

Even though the guide pins 345 project from the connecting end face 341a of the optical connector 340, the insertion portion 3120 can be accommodated in the connector accommodating hole 352 without having interference with the guide pins 345 since the guide pins 3145 are accommodated in the recesses 3122 provided in the insertion portion 3120.

Insertion of the insertion portion 3120 into the adapter 350 may be performed by an operator while holding and pushing the tool body 310 by hand. The control dial 334 can be operated using the same hand holding the tool body 310; therefore, the cleaning operation can be performed by one hand.

When the control dial 334 is rotated by a predetermined amount, the tape 32 is moved interlocking with the rotation of the winding reel 331, and the connecting end face 341a is wiped by the tape 32 so that dirt such as particles, dust, or oil on the connecting end face 341a is sufficiently wiped off by the tape 32.

Because the movement of the insertion portion 3120 in the direction of width during cleaning is restricted by the elastic forces of the engagement fingers 353 engaging the engagement recesses 3121, and because the guide pins 345 are accommodated in the recesses 3122 which are separated from the cleaning element 32 by partitions 3122a, the abutting position of the cleaning element 32 with respect to the connecting end face 341a is prevented from shifting, and the interferences between the cleaning element 32 and the guide pins 345 can also be prevented.

Because the dirt which has been wiped off adheres to the tape 32, and moves along the direction of winding by the winding reel 331, and because the used portion of the tape 32 is no longer exposed through the aperture 3126 of the insertion portion 3120 the dirt will not again adhere to the connecting end face 341a.

Accordingly, the connecting end face 341a can be cleaned to an extreme degree.

In the cleaning tool 31, because the insertion portion 3120 is held in position in the adapter 350 in a stable manner due to the internal structure of the adapter 350, the head element 3130 can be positioned with respect to the connecting end face 341a of the optical connector 340 in a stable manner, and the tape 32 can be stably abutted against the proper position of the connecting end face 341a without providing a guide element for guiding back-and-forth movement of the cleaning tool 31 even when an insertion operation of the insertion portion 3120 into the adapter 350 and a cleaning operation while operating the control dial 334 are performed by just a hand.

After cleaning, when the cleaning tool 31 is drawn in the direction opposite to insertion, because the engagement fingers 353 of the adapter 350 are expanded toward the gap 355 by the leading portions 3121a of the engagement recesses 3121, the engagement fingers 353 disengage from the engagement recesses 3121, and the insertion portion 3120 can be easily withdrawn.

In the above cleaning tool, insertion portions other than the insertion portion 3120, each of which has the same engaging attachment portion as the insertion portion 3120, can be attached to the attachment portion of the tool body. As a result, various optical connectors (plugs) accommodated in respective connector housings can be cleaned while adapting to types, sizes, etc., of the connector housings.

In order to replace the insertion portion 3120 mounted in the tool body 310, the engagement element 3110 is disengaged from the tool body 310, and the insertion portion 3120 is drawn and removed from the engaging attachment portion 317 of the tool body 310. Even when the insertion portion 3120 is removed from the engaging attachment portion 317 of the tool body 310, the position of the head element 3130, which is supported by the support bar 3131, with respect to the tool body 310 is unchanged; therefore, the tape 32 is maintained running along the head element 3130. Another insertion portion, which replaces the insertion portion 3120 that has been mounted, is attached to the tool body 310 in such a manner that the tool body 310 is pressed against the engaging attachment portion 317 while accommodating the head element 3130, the support bar 3131, and the tape 32 running along the head element 3130, in the through hole.

In the cleaning tool 31, when the insertion portion 3120 is removed from the engaging attachment portion 317 of the tool body 310, the pair of half casings 311 and 312 can easily disassembled. If three elements, i.e., the insertion portion 3120, and the pair of half casings 311 and 312, are disassembled, the tape 32 can be efficiently replaced. In this case, it is also easy to dispose the tape 32 via the head element 3130.

Figure 24:
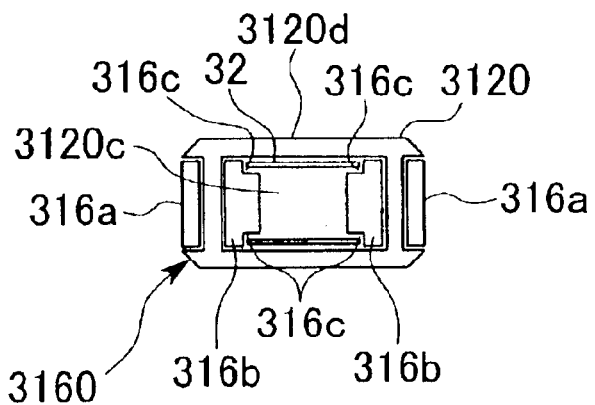
FIG. 24 is a cross-sectional view showing a tape positioning portion.

As shown in FIGS. 19 and 24, the cleaning tool 31 is provided, in the insertion portion 3120, with a tape positioning section 3160 which prevents the tape 32 from torsion or from shifting in the direction of width.

The tape positioning section 3160 shown in FIG. 24 is provided in the vicinity of engaging portion between the engagement attachment portion 317 of the tool body 310 and the engagement attachment portion 3120a of the insertion portion 3120. In the vicinity of engaging portion between the engagement attachment portion 317 of the tool body 310 and the engagement attachment portion 3120a of the insertion portion 3120, the tape 32 is prevented from shifting in the direction of width of the insertion portion 3120 by the pair of insertion projections 316b in such a manner that the tape 32 is disposed between the pair of insertion projections 316b which are inserted in the through hole 3120c of the insertion portion 3120, and both sides of the tape 32 in the direction of width are held in guide grooves 316c, each of which is formed in each of the insertion projections 316b. Each of the guide grooves 316c is formed by recessing a surface of the insertion projection 316b, which faces the other insertion portion 316b, so as to extend along the entire length of the insertion projection 316b, and the guide grooves 316c connect the exterior of the tool body 310 to the interior thereof. In the embodiment shown in FIG. 24, the pair of the guide grooves 316c is formed in portions, which face either walls 3120d of the insertion portion 3120 disposed in the direction of thickness, of the insertion projection 316b inserted in the through hole 3120c of the insertion portion 3120, and torsion of the tape 32 is prevented because the tape 32 is accommodated in the guide grooves 316c formed, in a slit-shape, between two walls 3120d of the insertion portion 3120 disposed in the direction of thickness and the insertion projection 316b. The insertion portion to be attached to the tool body may be any one in which the insertion projections 316b as the tape positioning section can be accommodated.

The tape positioning section 3160 shown in FIG. 24 prevent torsion of the tape 32 and shift of the insertion portion 3120 in the direction of width in such a manner that the tape is sandwiched between two walls 3120d of the insertion portion 3120 disposed in the direction of thickness and the insertion projections 316b of the half casings 311 and 312; however, the tape positioning section 3160 is not limited to this example, and another tape positioning section may be employed which comprises the pair of insertion projections 316b while excluding the walls 3120d of the insertion portion 3120 disposed in the direction of thickness. The position where a tape positioning section is provided may be a portion which is closer to the head element 3130 such as the middle point of the insertion portion 3120 as viewed in the direction of the axis (in other words, the middle point of the through hole 3120c as viewed in the direction of the axis). For example, the tape positioning section may be formed by, depending on the projecting length of the tool body 310, the pair of insertion projections 316b which can be inserted so as to reach a position further backward (i.e., closer to the head element 3130) from where the engaging attachment portion 317 of the tool body 310 engages the engaging attachment portion 3120a of the insertion portion 3120.

In order to reliably perform cleaning of the connecting end face 341a of the optical connector 340, it is necessary to prevent shifting of the tape 32 in the vicinity of the insertion portion; more specifically, it is important to prevent shifting of the tape 32 in the direction of width in order to ensure that the tape 32 is abutted against a desired portion of the connecting end face 341a. Therefore, the tape positioning section must specifically function so as to prevent shifting of the tape 32 in the direction of width. If the insertion portion 3120 comprises a tape positioning section, the tape 32, which is to be abutted against the connecting end face 341a of the optical connector 340, is reliably prevented from shifting due to feeding or rocking of the head element 3130; therefore, it is possible to accurately and constantly abut the tape 32 against a desired portion of the connecting end face 341a of the optical connector 340, and the efficiency of cleaning can be improved.

Figure 25A:
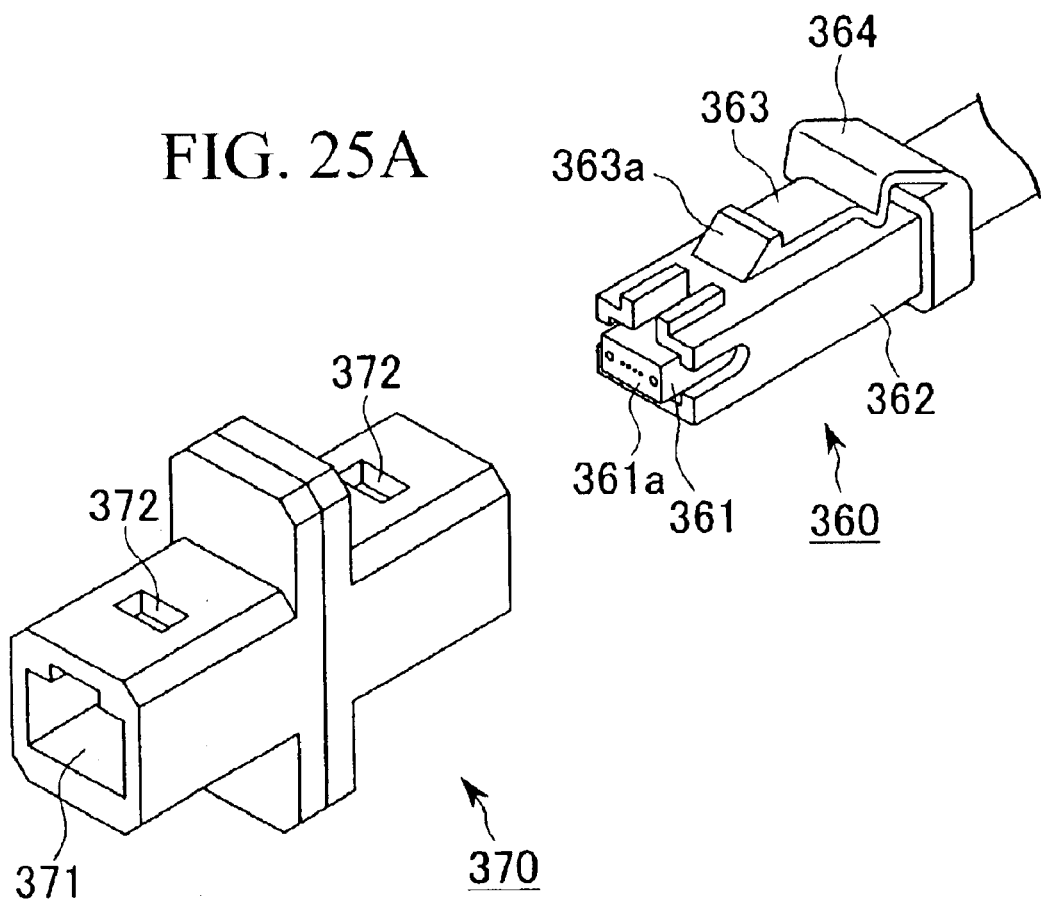
FIG. 25A is a perspective view showing other optical connector and connector housing to which an alternative optical connector cleaning tool is applied.
Figure 25B:
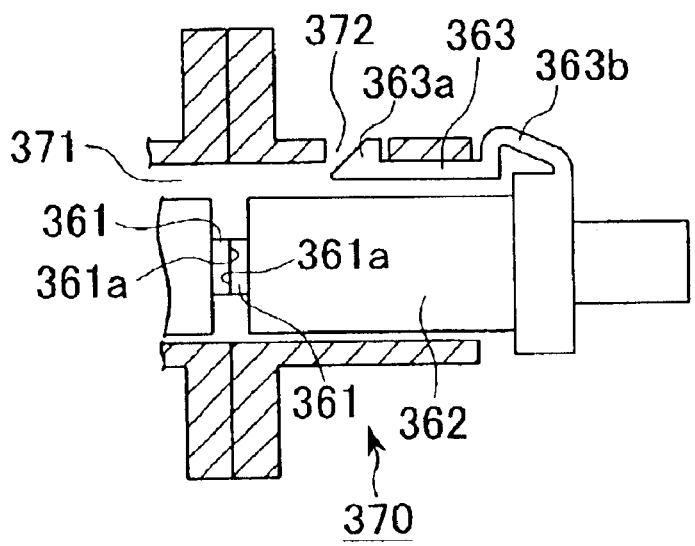
FIG. 25B is a cross-sectional view showing a state in which these optical connector and connector housing are optically connected to each other.

In FIGS. 25A and 25B, reference symbol 360 indicates an optical connector generally known as a MT-RJ type optical connector. When the optical connectors 360 are inserted through either ends of an optical connector adapter 370 (adapter), ferrules 361 of the optical connectors 360 are abutted each other, and optical fibers fixed in the ferrules 361 are optically connected. The ferrule 361 may be of the above MT type optical connector. In this case, two ferrules 361 can be connected to each other in an abutting manner while being accurately positioned by inserting guide pins (not shown) projecting from a connecting end face 361a of one of the ferrules 361 into guide pin holes 361c formed at either side ends of a connecting end face 361a of the other of the ferrules 361.

The optical connector 360 inserted in the adapter 370 is prevented from being removed in such a manner that an engagement finger 363a, which is formed at the front end of a latch 363 that extends from a housing 362 forwardly in the direction of insertion, engages an engagement hole 372 of the adapter 370 in a disengageable manner. On the other hand, when a lever portion 363b of the latch 363, which is exposed outside the adapter 370, is pressed so as to disengage the latch 363 from the engagement hole 372 of the adapter 370, the optical connector 360 can be removed from the adapter 370.

Figure 26A:
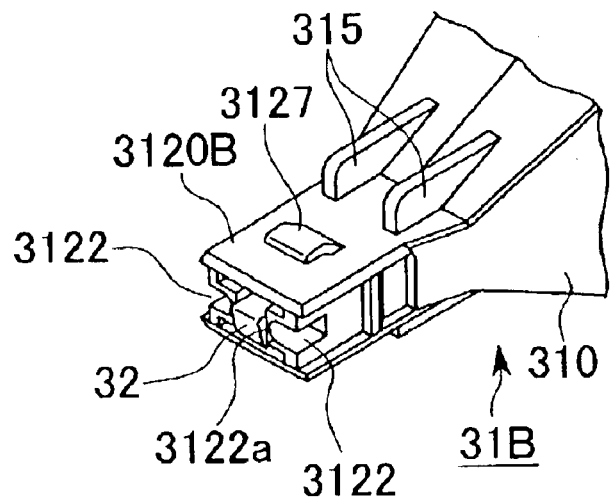
FIG. 26A is a perspective view showing the alternative optical connector cleaning tool.
Figure 26B:
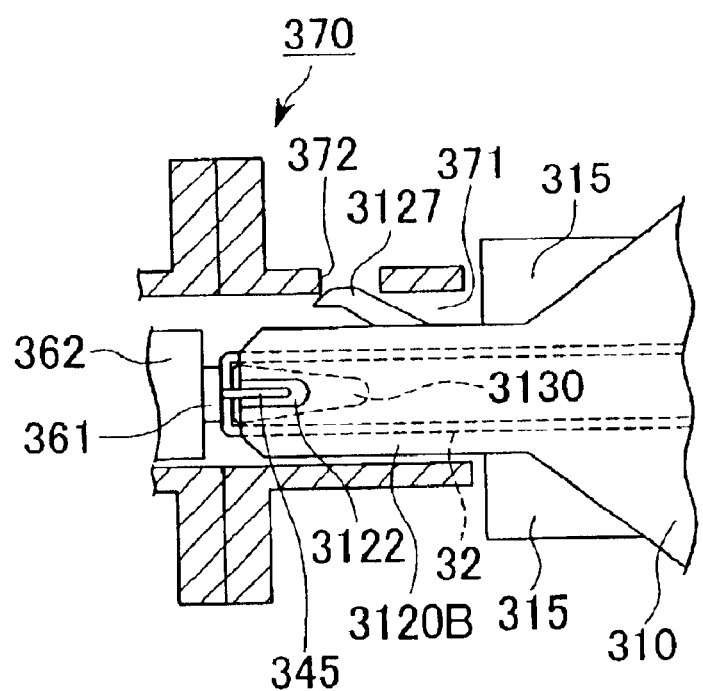
FIG. 26B is a cross-sectional view showing a state in which the alternative optical connector cleaning tool is abutted against the connector housing.

FIGS. 26A and 26B show a state in which an insertion portion 3120B, which is used for cleaning the connecting end face 361a of the optical connector 360 inserted into the adapter 370, is attached to the tool body 310.

The insertion portion 3120B comprises the head element 3130 having the abutting surface 3132 along which the cleaning element (tape) runs, and the aperture 3126 which opens toward the front end of the insertion portion 3120B, and through which the head element 3130 is exposed.

In either side surfaces of the insertion portion 3120B, there are provided the recesses 3122 for preventing interference of the guide pins of the optical connector 360. Furthermore, on the upper surface of the insertion portion 3120B, there is provided an engagement projection 3127 which is engageable with the engagement hole 372 of the adapter 370.

The cleaning procedure for the connecting end face 361a of the optical connector 360 inserted in the adapter 370 using the cleaning tool 31B is similar to that using the cleaning tool 31 in the third embodiment, and first, the insertion portion 3120B of the cleaning tool 31B is inserted into the connector accommodating hole 371 of the adapter 370 while being guided by the inner wall of the adapter 370 so that the engagement projection 3127 engages the engagement hole 372. As a result, a portion of the tape 32 located at projecting end of the insertion portion 3120B is positioned and abutted against the connecting end face 361a.

Figure 27:
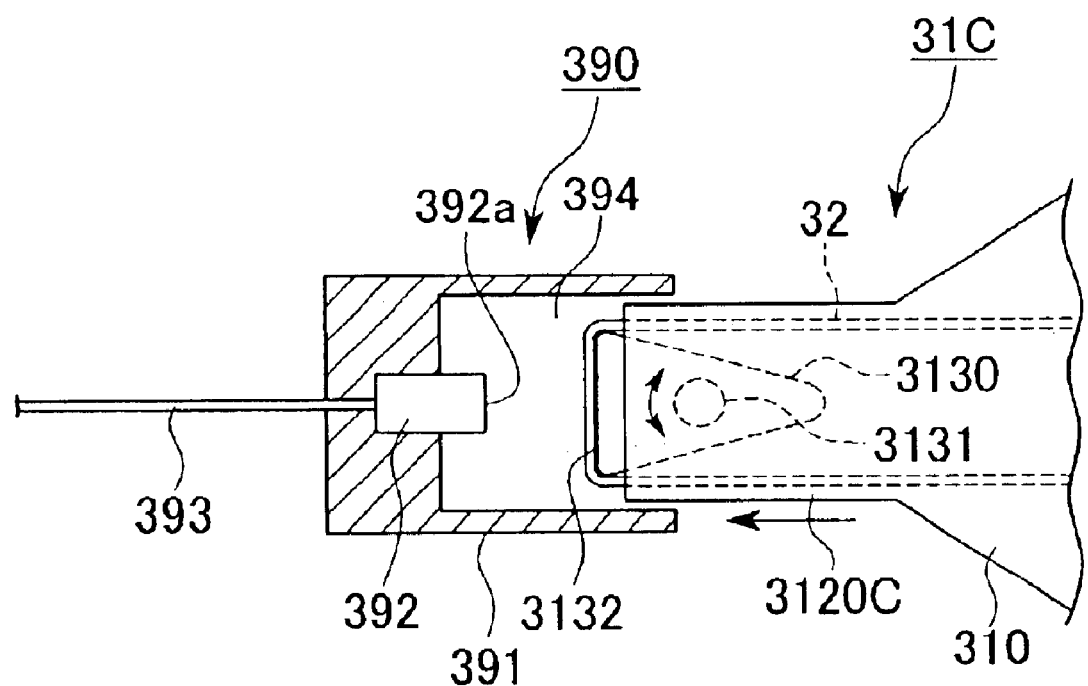
FIG. 27 is a cross-sectional view further showing the alternative optical connector cleaning tool in a state in which the alternative optical connector cleaning tool is going to be inserted toward an optical connector in an optical connector receptacle.

As another example, an optical connector receptacle may be applicable as a connector housing. As shown in FIG. 27, the optical connector receptacle 390 as an example is assembled such that a ferrule 392 attached to the end of an optical fiber 393 is installed in a housing 391.

An optical connector cleaning tool 31C may be used whose cleaning element 32 can be positioned and abutted against a connecting end face 392a of the ferrule 392 by inserting the insertion portion 3120C into a connector accommodating hole 394 of the optical connector receptacle 390. In this embodiment, the ferrule 392 itself functions as an optical connector.

The insertion portion is not necessarily formed in a housing shape, but may be formed in other shapes as long as it is possible to reliably position the insertion portion when being inserted into a connector housing.

The cleaning element is not limited to a tape, and a swab or other elements may be employed. The driving section may be changed depending on the cleaning element.

The optical connector (optical connector accommodated in a housing such as an optical connector adapter) to be cleaned is not limited to the above MPO type optical connector, and an optical connector comprising a capillary-shaped ferrule or the like, such as, for example, SC type optical connector (Single fiber Coupling optical fiber connector specified in JIS C 5973 or IEC 61754-4) may also be used.

As explained above, because the optical connector cleaning tool of the present invention comprises a tool body, and an insertion portion which is provided so as to project from the tool body, and which is adapted to be inserted into the connector housing, wherein the cleaning element disposed at an end of the insertion portion projecting from the tool body is positioned against the connecting end face when the insertion portion is inserted into the connector housing, the cleaning element can be appropriately abutted against the connecting end face of the optical connector disposed inside the connector housing merely by inserting the insertion portion into the connector housing, and moreover, contact of the cleaning tool with the inner wall of the connector housing is prevented; therefore, contamination of the cleaning element can be avoided.

Moreover, when the cleaning element is moved so as to wipe off dirt, it is easy to maintain the cleaning element abutting against a proper position of the connecting end face; therefore, the connecting end face can be easily and reliably cleaned. The abutting position of the cleaning element will not easily shift even when the cleaning tool is held by hand. In addition, because the insertion portion can be held in the connector housing with a light effort, workability is superior.

If a tape is used as the cleaning element, if the tool body is provided with a rotatable supply reel which holds the tape in a wound manner and a rotatable winding reel which retrieves the tape after cleaning by winding the tape, and if a head element is provided at the insertion portion, which has an abutting surface at a tip thereof for ensuring abutting area against the connecting end face, it is possible to sequentially abut the clean portion of the tape against the connecting end face of the optical connector; therefore, an efficient cleaning operation can be achieved.

Furthermore, if the head element is adapted so that the direction of the abutting surface with respect to the direction of insertion of the insertion portion is adjustable the direction of the abutting surface of the head element can be aligned with the direction of the connecting end face of the optical connector even though the direction of the connecting end face of the optical connector is not aligned with the direction of insertion of the insertion portion; therefore, efficiency of cleaning may be improved.

The insertion portion may preferably comprise a recess for preventing interference with a projecting element (e.g., a guide pin in an MPO type optical connector) projecting from the connecting end face. Accordingly, cleaning can be sufficiently performed by abutting the cleaning element against the connecting end face even though there is a projecting element on the connecting end face.

Furthermore, an optical connector cleaning tool according to the present invention comprises an insertion portion which is provided so as to project from a tool body, and which is adapted to be inserted into the connector housing, a cleaning element disposed at an end of the insertion portion, and a driving section for moving the cleaning element, wherein the insertion portion is provided with insertion units at a plurality of positions in the projecting direction thereof, each of which is positioned in the connector housing when being inserted into one of connector housings which differ from each other, and wherein any one of the insertion units provided on the insertion portion is formed so as to be insertable into any connector housing which can house another insertion unit located behind the one insertion unit as viewed in the projecting direction.

According to the above optical connector cleaning tool, because the insertion portion can be inserted into various connector housings in an appropriately positioned manner by using the insertion units, various optical connectors can be cleaned just by one cleaning tool.

The cleaning element, which is placed on the insertion portion at the projecting end as viewed from the tool body, can be appropriately positioned with respect to the connecting end face by inserting the insertion portion of the cleaning tool into along the inner wall of the connector housing. As a result, when the cleaning element is inserted into the connector housing, contact of the cleaning tool with the inner wall of the connector housing is prevented; therefore, contamination of the cleaning element can be avoided. In addition, when the cleaning element is moved so as to wipe off dirt it is easy to maintain the cleaning element abutting against a proper position of the connecting end face; therefore, the connecting end face can be easily and reliably cleaned. The abutting position of the cleaning element will not easily shift even when the cleaning tool is held by hand. Furthermore, because the insertion portion can be held in the connector housing with a light effort, workability is superior.

In the above optical connector cleaning tool of the present invention, if the cleaning element is a tape which runs around a head element provided at a projecting tip of the insertion portion projecting from the tool body, and which is adapted to be abutted against the connecting end face of the optical connector disposed in the connector housing by an abutting surface of the head element, and if the driving section is a tape feeding section which feeds and moves the tape, the clean portion of the tape is sequentially abutted against the connecting end face of the optical connector; therefore, an efficient cleaning operation can be achieved.

Moreover, an optical connector cleaning tool according to the present invention comprises an insertion portion which is provided so as to project from the tool body, and which is adapted to be inserted into the connector housing, wherein the cleaning element disposed at an end of the insertion portion projecting from the tool body is positioned against the connecting end face when the insertion portion is inserted into the connector housing; therefore, when the cleaning element is inserted into the connector housing, contact of the cleaning tool with the inner wall of the connector housing is prevented, and contamination of the cleaning element can be avoided. In addition, in this cleaning tool, the insertion portion is replaceable, flexibility of the cleaning tool with respect to the connector housing is ensured by selecting the insertion portion (i.e., by selecting an appropriate insertion portion depending on size, shape, etc., of the connector housing). As a result, it is not necessary to provide various cleaning tools corresponding to different connector housings; therefore, an effect such as cost reduction may be achieved.

According to the present invention, when a tape is used as the cleaning element, it is possible to efficiently perform cleaning while accurately abutting the tape against a desired position in the connecting end face of the optical connector by employing an insertion portion which can be properly positioned by insertion depending on the connector housing.

What is claimed is:
1. An optical connector cleaning tool for cleaning a connecting end face of an optical connector disposed inside a connector housing by movement of a cleaning element to wipe the connecting end face, comprising:

a tool body; and an insertion portion which is provided so as to project from the tool body, and which is adapted to be inserted into the connector housing, wherein the cleaning element disposed at an end of the insertion portion projecting from the tool body is positioned against the connecting end face when the insertion portion is inserted into the connector housing.

2. An optical connector cleaning tool according to claim 1, wherein the cleaning element is a tape, wherein the tool body is provided with a supply reel which hold the tape in a wound manner, and a winding reel which retrieves the tape after cleaning by winding the same, and wherein a head element is provided at the insertion portion, which has an abutting surface at a tip thereof for ensuring abutting area against the connecting end face, and which is adapted so that the tape supplied from the supply reel runs along the abutting surface.

3. An optical connector cleaning tool according to claim 1, wherein the head element is adapted so that the direction of the abutting surface with respect to the direction of insertion of the insertion portion is adjustable.

4. An optical connector cleaning tool according to claim 1, wherein the insertion portion comprises a recess for preventing interference with a projecting element projecting from the connecting end face.

5. An optical connector cleaning tool for cleaning a connecting end face of an optical connector disposed inside a connector housing by movement of a cleaning element to wipe the connecting end face, comprising:

a tool body;

an insertion portion which is provided so as to project from the tool body, and which is adapted to be inserted into the connector housing;

a cleaning element disposed at an end of the insertion portion; and a driving section for moving the cleaning element, wherein the insertion portion is provided with insertion units at a plurality of positions in the projecting direction thereof, each of which is positioned in the connector housing when being inserted into one of connector housings which differ from each other, and wherein any one of the insertion units provided on the insertion portion is formed so as to be insertable into any connector housings which can house another insertion unit located behind the one insertion unit as viewed in the projecting direction.

6. An optical connector cleaning tool according to claim 5, wherein the cleaning element is a tape which runs around a head element provided at a projecting tip of the insertion portion projecting from the tool body, and which is adapted to be abutted against the connecting end face of the optical connector disposed in the connector housing by an abutting surface of the head element, and wherein the driving section is a tape feeding section which feeds and moves the tape.

7. An optical connector cleaning tool for cleaning a connecting end face of an optical connector disposed inside a connector housing by movement of a cleaning element to wipe the connecting end face, comprising:

a tool body;

an insertion portion which is provided so as to project from the tool body, which is positioned by an inner wall of the connector housing when being inserted into the connector housing, and which is engaged and held in the connector housing in a detachable manner;

a cleaning element which is provided at an end of the insertion portion, and which is positioned and abutted against the connecting end face of the optical connector disposed inside the connector housing; and a driving section for moving the cleaning element, wherein the insertion portion is adapted to be replaceable with other insertion portions with respect to the tool body.

8. An optical connector cleaning tool according to claim 7, wherein the insertion portion is a sleeve-shaped housing which houses the cleaning element, and which is attached to a fitting portion of the tool body in a detachable manner.

9. An optical connector cleaning tool according to claim 7, wherein the cleaning element is a tape which runs around a head element provided at a projecting tip of the insertion portion projecting from the tool body, and which is adapted to be abutted against the connecting end face of the optical connector disposed in the connector housing by an abutting surface of the head element, and wherein the driving section is a tape feeding section which feeds and moves the tape.

* * * * *

UNITED STATES PATENT AND TRADEMARK OFFICE
CERTIFICATE OF CORRECTION

PATENT NO. : 6,905,251 B2
DATED : June 14, 2005
INVENTOR(S) : Fujiwara et al.

It is certified that error appears in the above-identified patent and that said Letters Patent is hereby corrected as shown below:

Column 11,
Line 59, now reads "when the cleaning too" should read -- when the cleaning tool --.

Signed and Sealed this

Twentieth Day of September, 2005

JON W. DUDAS
*Director of the United States Patent and Trademark Office*